United States Patent
Sun et al.

(10) Patent No.: US 10,530,514 B2
(45) Date of Patent: *Jan. 7, 2020

(54) TECHNIQUES FOR TRANSMITTING OR USING A PULL-IN SIGNAL TO LOCATE A SYNCHRONIZATION CHANNEL

(71) Applicant: QUALCOMM Incorporated, San Diego, CA (US)

(72) Inventors: Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/891,072

(22) Filed: Feb. 7, 2018

(65) Prior Publication Data

US 2018/0167155 A1 Jun. 14, 2018

Related U.S. Application Data

(63) Continuation of application No. 15/828,009, filed on Nov. 30, 2017.

(Continued)

(51) Int. Cl.
*H04J 11/00* (2006.01)
*H04J 3/06* (2006.01)
(Continued)

(52) U.S. Cl.
CPC ............ *H04J 11/0073* (2013.01); *H04J 1/06* (2013.01); *H04J 3/0614* (2013.01);
(Continued)

(58) Field of Classification Search
CPC ............... H04J 11/0073; H04J 11/0076; H04J 11/0086; H04J 13/00; H04J 1/06;
(Continued)

(56) References Cited

U.S. PATENT DOCUMENTS 9,166,718 B2    10/2015  Chen et al.
2008/0192845 A1* 8/2008  Aizawa ............ H04L 25/03866
                                                 375/260

(Continued)

OTHER PUBLICATIONS

Nokia et al., "On Remaining System Information Delivery", 3GPP Draft; R1-1705841, 3rd Generation Partnership Project (3GPP), Mobile Competence Centre: 650, Route des Lucioles; F-06921 Sophia-Antipolis Cedex; France, vol. RAN WG1 , No. Spokane, WA, USA; 20170403-20170407, Apr. 2, 2017, XP051243953, Retrieved from the Internet: URL:http://www.3gpp.org/ftp/Meetings_3GPP_SYNC/RAN1/Docs/ [retrieved on Apr. 2, 2017], 5 pages.

(Continued)

*Primary Examiner* — Mohamed A Kamara
(74) *Attorney, Agent, or Firm* — Holland & Hart LLP

(57) ABSTRACT

Techniques are described for wireless communication. One method includes searching for a synchronization channel on a first raster point of a frequency raster identified for synchronization channel transmission. The frequency raster includes a plurality of raster points in a radio frequency spectrum. The method also includes identifying a pull-in signal on the first raster point; determining, from the pull-in signal, a second raster point of the frequency raster on which the synchronization channel is transmitted; and receiving the synchronization channel on the second raster point. Another method includes transmitting the pull-in signal and the synchronization channel.

30 Claims, 16 Drawing Sheets

Related U.S. Application Data

(60) Provisional application No. 62/429,582, filed on Dec. 2, 2016.

(51) Int. Cl.
  *H04J 1/06* (2006.01)
  *H04L 5/00* (2006.01)
  *H04L 27/26* (2006.01)
  *H04J 13/00* (2011.01)
  *H04W 52/02* (2009.01)

(52) U.S. Cl.
  CPC ....... *H04J 11/0076* (2013.01); *H04J 11/0086* (2013.01); *H04L 5/005* (2013.01); *H04L 5/0092* (2013.01); *H04L 27/2613* (2013.01); *H04L 27/2692* (2013.01); *H04J 13/00* (2013.01); *H04J 2211/005* (2013.01); *H04J 2211/006* (2013.01); *H04W 52/0203* (2013.01); *H04W 52/0209* (2013.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/22* (2018.01)

(58) Field of Classification Search
  CPC ........... H04J 2211/005; H04J 2211/006; H04J 3/0614; H04L 27/2613; H04L 5/005; H04L 5/0092; H04L 5/001; H04W 52/0203; H04W 52/0209; H04W 48/16; H04W 56/00
  See application file for complete search history.

(56) References Cited

U.S. PATENT DOCUMENTS

| | | | |
|---|---|---|---|
| 2012/0281594 A1* | 11/2012 | Stewart | H04W 16/14 370/259 |
| 2013/0058240 A1 | 3/2013 | Kim et al. | |
| 2013/0143502 A1* | 6/2013 | Kazmi | H04W 88/06 455/62 |
| 2014/0128085 A1 | 5/2014 | Charbit | |
| 2016/0043849 A1 | 2/2016 | Lee et al. | |
| 2016/0308637 A1 | 10/2016 | Frenne et al. | |
| 2017/0094624 A1 | 3/2017 | Balachandran et al. | |
| 2017/0280484 A1 | 9/2017 | Awad | |
| 2018/0084593 A1 | 3/2018 | Chen et al. | |
| 2018/0159649 A1* | 6/2018 | Sun | H04J 11/0086 |
| 2018/0167946 A1 | 6/2018 | Si et al. | |
| 2018/0192383 A1 | 7/2018 | Nam et al. | |
| 2018/0192412 A1 | 7/2018 | Novlan et al. | |
| 2018/0199343 A1 | 7/2018 | Deogun et al. | |
| 2018/0262977 A1 | 9/2018 | Lee et al. | |
| 2018/0278314 A1 | 9/2018 | Nam et al. | |
| 2018/0324678 A1 | 11/2018 | Chen et al. | |
| 2018/0337755 A1 | 11/2018 | John et al. | |
| 2019/0098591 A1* | 3/2019 | Wu | H04L 5/0091 |
| 2019/0223090 A1 | 7/2019 | Lee et al. | |
| 2019/0288813 A1 | 9/2019 | John et al. | |

OTHER PUBLICATIONS

Huawei et al., "Search Space Design Considerations", Apr. 2017, 3GPP TSG RAN WG1 #88bis—R1-1704202, 2017, 4 pages.

NTT Docomo, Inc., "Discussion on Remaining System Information Delivery in NR", Apr. 2017, 3GPP TSG RAN WG1 #88bis—R1-1705709, 2017, 3 pages.

Samsung: "Configuration and Functionalities of Common Search Space", Apr. 2017, 3GPP TSG RAN WG1 #88bis, R1-1705379, 2017, 3 pages.

Catt: "Offline Summary for AI 7.1.2.2 Remaining Details on Remaining Minimum System Information", 3GPP TSG RAN WG1 Meeting #90bis, R1-1719145, Prague, CZ, Oct. 9-13, 2017, pp. 1-15.

Huawei:"Email discussion [86b-20] on synchronization and carrier rasters for NR," 3GPP Draft; R1-1611684, Email Discussions 86B-20 on Synchronization and Carrier Rasters for NR V5,3<sup>rd</sup> Generation Partnership Project (3GPP), Mobile Competence Centre; 650,Route Des Lucioles; F-0692, vol. RAN WG1, Reno, USA; 20161114-20161118, 14<sup>th</sup> Nov. 2016 (Nov. 14, 2016), XP051176990, 11 pages. Retrieved from the Internet: URL: http://www.3gpp.org/ftp/Meetings_3GPPSYNC/RAN1/Docs/ [retrieved on Nov. 14, 2016].

Samsung: "Remaining Minimum System Information Delivery", 3GPP TSG RAN WG1 Meeting #90, R1-1713556, Prague, Czechia, Aug. 21-25, 2017, pp. 1-5.

Sengupta S., et al., "SpiderRadio: A Cognitive Radio Network with Commodity Hardware and Open Source Software", IEEE Communications Magazine, IEEE Service Center, Piscataway, US, vol. 49, No. 3, Mar. 1, 2011 (Mar. 1, 2011), pp. 101-109, XP011349626, ISSN: 0163-6804, DOI: 10.11 09/MCOM.2011.5723806.

International Search Report and Written Opinion—PCT/US2017/064294—ISA/EPO—dated Mar. 26, 2018.

U.S. Appl. No. 15/968,569, filed May 1, 2018.

\* cited by examiner

TECHNIQUES FOR TRANSMITTING OR USING A PULL-IN SIGNAL TO LOCATE A SYNCHRONIZATION CHANNEL

CROSS REFERENCES

The present Application for Patent is a Continuation of U.S. patent application Ser. No. 15/828,009 by Sun et al., entitled "Techniques for Transmitting or Using a Pull-In Signal to Locate a Synchronization Channel," filed Nov. 30, 2017, which claims priority to U.S. Provisional Patent Application No. 62/429,582 by SUN et al., entitled "Techniques For Transmitting or Using A Pull-In Signal to Locate A Synchronization Channel," filed Dec. 2, 2016, assigned to the assignee hereof.

BACKGROUND

Field of the Disclosure

The present disclosure, for example, relates to wireless communication systems, and more particularly to techniques for transmitting or using a pull-in signal to locate a synchronization channel.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of network access devices, each simultaneously supporting communication for multiple communication devices, otherwise known as user equipment (UEs). In a Long-Term Evolution (LTE) or LTE-Advanced (LTE-A) network, a network access device may take the form of a base station, with a set of one or more base stations defining an eNodeB (eNB). In a next generation, 5G, or new radio (NR) network, a network access device may take the form of a smart radio head (RH) or access node controller (ANC), with a set of smart radio heads in communication with an ANC defining a gNodeB (gNB). A network access device may communicate with a set of UEs on downlink channels (e.g., for transmissions from a network access device to a UE) and uplink channels (e.g., for transmissions from a UE to a network access device).

At times, a UE may need to perform an initial access (or initial acquisition) procedure to gain access to a wireless network. As part of the initial access procedure, the UE may search for a synchronization channel transmitted by a network access device of the wireless network. The synchronization channel may be transmitted at an unknown time on an unknown frequency, and thus, the UE may blindly search for the synchronization channel at various time and frequency locations. In some cases, the frequency locations may be limited to a discrete set of raster points (frequencies) of a known frequency raster.

SUMMARY

Blindly searching for a synchronization channel takes time, is inefficient, and can increase a UE's initial acquisition time (or average initial acquisition time). To decrease a UE's synchronization channel search time, and thereby decrease the UE's initial acquisition time (or average initial acquisition time), a network access device may transmit pull-in signals on one or more raster points of a frequency raster. A pull-in signal may contain information that assists a UE in locating a network access device's synchronization channel transmissions and may indicate, for example, a raster point or timing of a next instance of a synchronization channel transmitted by the network access device. A UE that searches for a synchronization channel on a raster point that does not contain a synchronization channel transmission may identify a pull-in signal on the raster point. The UE may then determine, from the pull-in signal, a second raster point on which a synchronization channel is transmitted, and may search for the synchronization channel on the raster point on which the synchronization channel is transmitted. When the pull-in signal also contains timing information for the synchronization channel, the UE may transition to a power saving state after determining the timing of the synchronization channel, and may transition from the power saving state to an awake state based at least in part on the timing of the synchronization channel.

In one example, a method for wireless communication at a wireless device is described. The method may include searching for a synchronization channel on a first raster point of a frequency raster identified for synchronization channel transmissions. The frequency raster may include a plurality of raster points in a radio frequency spectrum. The method may also include identifying a pull-in signal on the first raster point; determining, from the pull-in signal, a second raster point of the frequency raster on which the synchronization channel is transmitted; and receiving the synchronization channel on the second raster point.

In some examples of the method, the pull-in signal may indicate the second raster point relative to the first raster point. In some examples, the method may include determining, from the pull-in signal, a timing of the synchronization channel. In some examples, the method may include transitioning to a power saving state after determining the timing of the synchronization channel, and transitioning from the power saving state to an awake state based at least in part on the timing of the synchronization channel. In some examples, the pull-in signal may indicate the timing of the synchronization channel relative to a second timing of the pull-in signal. In some examples, the pull-in signal may include a pull-in primary synchronization channel (PI-PSS) and a pull-in secondary synchronization channel (PI-SSS), and the pull-in signal may be identified based at least in part on the PI-PSS. In some examples, the PI-PSS may have a same duration as a primary synchronization channel (PSS) of the synchronization channel, and the PI-PSS and the PSS may include different sequences. In some examples, the pull-in signal may include a pull-in information channel (PITCH) that indicates the second raster point.

In some examples of the method, the pull-in signal may include a PI-PSS and a PI-SSS, and the pull-in signal may be identified based at least in part on matching the PI-PSS and the PI-SSS to a combination of PSS and SSS reserved to identify the pull-in signal. In some examples, the method may include receiving a data burst over a contention-based radio frequency spectrum. In these examples, the pull-in signal may be identified, and the synchronization channel may be received, over the contention-based radio frequency spectrum, and the pull-in signal may be identified within the data burst. In some examples, the pull-in signal may be identified, and the data burst may be received, over the contention-based radio frequency spectrum on a same transmission beam. In some examples, the pull-in signal may be identified, and the synchronization channel may be received, over a non-contention-based radio frequency spectrum, and the pull-in signal may be identified in at least one of an empty downlink data resource, an empty control resource, a resource that punctures a physical downlink shared channel (PDSCH), a resource that is rate-matched around by the PDSCH, or a combination thereof.

In one example, an apparatus for wireless communication at a wireless device is described. The apparatus may include means for searching for a synchronization channel on a first raster point of a frequency raster identified for synchronization channel transmissions. The frequency raster may include a plurality of raster points in a radio frequency spectrum. The apparatus may also include means for identifying a pull-in signal on the first raster point; means for determining, from the pull-in signal, a second raster point of the frequency raster on which the synchronization channel is transmitted; and means for receiving the synchronization channel on the second raster point.

In some examples of the apparatus, the pull-in signal may indicate the second raster point relative to the first raster point. In some examples, the apparatus may include means for determining, from the pull-in signal, a timing of the synchronization channel. In some examples, the apparatus may include means for transitioning to a power saving state after determining the timing of the synchronization channel, and means for transitioning from the power saving state to an awake state based at least in part on the timing of the synchronization channel. In some examples, the pull-in signal may indicate the timing of the synchronization channel relative to a second timing of the pull-in signal. In some examples, the pull-in signal may include a PI-PSS and a PI-SSS, and the pull-in signal may be identified based at least in part on the PI-PSS. In some examples, the PI-PSS may have a same duration as a PSS of the synchronization channel, and the PI-PSS and the PSS may include different sequences. In some examples, the pull-in signal may include a PIICH that indicates the second raster point.

In some examples of the apparatus, the pull-in signal may include a PI-PSS and a PI-SSS, and the pull-in signal may be identified based at least in part on matching the PI-PSS and the PI-SSS to a combination of PSS and SSS reserved to identify the pull-in signal. In some examples, the apparatus may include means for receiving a data burst over a contention-based radio frequency spectrum. In these examples, the pull-in signal may be identified, and the synchronization channel may be received, over the contention-based radio frequency spectrum, and the pull-in signal is identified within the data burst. In some examples, the pull-in signal may be identified, and the data burst may be received, over the contention-based radio frequency spectrum on a same transmission beam. In some examples, the pull-in signal may be identified, and the synchronization channel may be received, over a non-contention-based radio frequency spectrum, and the pull-in signal may be identified in at least one of an empty downlink data resource, an empty control resource, a resource that punctures a PDSCH, a resource that is rate-matched around by the PDSCH, or a combination thereof.

In one example, another apparatus for wireless communication at a wireless device is described. The apparatus may include a processor, memory in electronic communication with the processor, and instructions stored in the memory. The instructions may be executable by the processor to search for a synchronization channel on a first raster point of a frequency raster identified for synchronization channel transmissions. The frequency raster may include a plurality of raster points in a radio frequency spectrum. The instructions may also be executable by the processor to identify a pull-in signal on the first raster point; to determine, from the pull-in signal, a second raster point of the frequency raster on which the synchronization channel is transmitted; and to receive the synchronization channel on the second raster point.

In some examples of the apparatus, the pull-in signal may indicate the second raster point relative to the first raster point. In some examples, the instructions may be executable by the processor to determine, from the pull-in signal, a timing of the synchronization channel. In some examples, the instructions may be executable by the processor to transition to a power saving state after determining the timing of the synchronization channel, and to transition from the power saving state to an awake state based at least in part on the timing of the synchronization channel. In some examples, the pull-in signal may indicate the timing of the synchronization channel relative to a second timing of the pull-in signal. In some examples, the pull-in signal may include a PI-PSS and a PI-SSS, and the pull-in signal may be identified based at least in part on the PI-PSS. In some examples, the PI-PSS may have a same duration as a PSS of the synchronization channel, and the PI-PSS and the PSS may include different sequences. In some examples, the pull-in signal may include a PIICH that indicates the second raster point.

In some examples of the apparatus, the pull-in signal may include a PI-PSS and a PI-SSS, and the pull-in signal may be identified based at least in part on matching the PI-PSS and the PI-SSS to a combination of PSS and SSS reserved to identify the pull-in signal. In some examples, the instructions may be executable by the processor to receive a data burst over a contention-based radio frequency spectrum. In these examples, the pull-in signal may be identified, and the synchronization channel may be received, over the contention-based radio frequency spectrum, and the pull-in signal may be identified within the data burst. In some examples, the pull-in signal may be identified, and the data burst may be received, over the contention-based radio frequency spectrum on a same transmission beam. In some examples, the pull-in signal may be identified, and the synchronization channel may be received, over a non-contention-based radio frequency spectrum, and the pull-in signal may be identified in at least one of an empty downlink data resource, an empty control resource, a resource that punctures a PDSCH, a resource that is rate-matched around by the PDSCH, or a combination thereof.

In one example, a computer program product including a non-transitory computer-readable medium is described. The non-transitory computer-readable medium may include instructions to search for a synchronization channel on a first raster point of a frequency raster identified for synchronization channel transmissions. The frequency raster may include a plurality of raster points in a radio frequency spectrum. The non-transitory computer-readable medium may also include instructions to identify a pull-in signal on the first raster point; instructions to determine, from the pull-in signal, a second raster point of the frequency raster on which the synchronization channel is transmitted; and instructions to receive the synchronization channel on the second raster point.

In some examples of the computer program product, the pull-in signal may indicate the second raster point relative to the first raster point. In some examples, the non-transitory computer-readable medium may include instructions to determine, from the pull-in signal, a timing of the synchronization channel. In some examples, the non-transitory computer-readable medium may include instructions to transition to a power saving state after determining the timing of the synchronization channel, and instructions to transition from the power saving state to an awake state based at least in part on the timing of the synchronization channel.

In one example, another method for wireless communication at a wireless device is described. The method may include transmitting a pull-in signal on a first raster point of a frequency raster identified for synchronization channel transmissions. The frequency raster may include a plurality of raster points in a radio frequency spectrum, and the pull-in signal may indicate a second raster point of the frequency raster on which the synchronization channel is transmitted. The method may also include transmitting the synchronization channel on the second raster point.

In some examples of the method, the pull-in signal may indicate the second raster point relative to the first raster point. In some examples, the pull-in signal may indicate a timing of the synchronization channel. In some examples, the pull-in signal may indicate the timing of the synchronization channel relative to a second timing of the pull-in signal. In some examples, the pull-in signal may include a PI-PSS and a PI-SSS. In some examples, the PI-PSS may have a same duration as a PSS of the synchronization channel, and the PI-PSS and the PSS may include different sequences. In some examples, the pull-in signal may include a PIICH that indicates the second raster point. In some examples, the pull-in signal may include a PI-PSS and a PI-SSS that match a combination of PSS and SSS reserved to identify the pull-in signal. In some examples, the pull-in signal and the synchronization channel may be transmitted over a contention-based radio frequency spectrum, and the pull-in signal may be transmitted within a data burst for which the wireless device has gained access to the contention-based radio frequency spectrum. In some examples, the pull-in signal and the data burst may be transmitted over the contention-based radio frequency spectrum on a same transmission beam.

In some examples of the method, the pull-in signal and the synchronization channel may be transmitted over a non-contention-based radio frequency spectrum, and the pull-in signal may be transmitted in at least one of an empty downlink data resource, an empty control resource, a resource that punctures a PDSCH, a resource that is rate-matched around by the PDSCH, or a combination thereof. In some examples, the method may include transmitting a plurality of instances of the synchronization channel. In these examples, the pull-in signal and the plurality of instances of the synchronization channel may be transmitted over a non-contention-based radio frequency spectrum, the pull-in signal may be frequency domain multiplexed with an instance of the synchronization channel, and the pull-in signal and the instance of the synchronization channel may be transmitted using a same transmission beam. In some examples, the method may include transmitting at least a second pull-in signal on a raster point of the frequency raster other than the second raster point. In some examples, the pull-in signal and the second pull-in signal may be staggered in at least one of: frequency, time, or a combination thereof.

In one example, another apparatus for wireless communication at a wireless device is described. The apparatus may include means for transmitting a pull-in signal on a first raster point of a frequency raster identified for synchronization channel transmissions. The frequency raster may include a plurality of raster points in a radio frequency spectrum, and the pull-in signal may indicate a second raster point of the frequency raster on which the synchronization channel is transmitted. The apparatus may also include means for transmitting the synchronization channel on the second raster point.

In some examples of the apparatus, the pull-in signal may indicate the second raster point relative to the first raster point. In some examples, the pull-in signal may indicate a timing of the synchronization channel. In some examples, the pull-in signal may indicate the timing of the synchronization channel relative to a second timing of the pull-in signal. In some examples, the pull-in signal may include a PI-PSS and a PI-SSS. In some examples, the PI-PSS may have a same duration as a PSS of the synchronization channel, and the PI-PSS and the PSS may include different sequences. In some examples, the pull-in signal may include a PIICH that indicates the second raster point. In some examples, the pull-in signal may include a PI-PSS and a PI-SSS that match a combination of PSS and SSS reserved to identify the pull-in signal. In some examples, the pull-in signal and the synchronization channel may be transmitted over a contention-based radio frequency spectrum, and the pull-in signal may be transmitted within a data burst for which the wireless device has gained access to the contention-based radio frequency spectrum. In some examples, the pull-in signal and the data burst may be transmitted over the contention-based radio frequency spectrum on a same transmission beam.

In some examples of the apparatus, the pull-in signal and the synchronization channel may be transmitted over a non-contention-based radio frequency spectrum, and the pull-in signal may be transmitted in at least one of an empty downlink data resource, an empty control resource, a resource that punctures a PDSCH, a resource that is rate-matched around by the PDSCH, or a combination thereof. In some examples, the apparatus may include means for transmitting a plurality of instances of the synchronization channel. In these examples, the pull-in signal and the plurality of instances of the synchronization channel may be transmitted over a non-contention-based radio frequency spectrum, the pull-in signal may be frequency domain multiplexed with an instance of the synchronization channel, and the pull-in signal and the instance of the synchronization channel may be transmitted using a same transmission beam. In some examples, the apparatus may include means for transmitting at least a second pull-in signal on a raster point of the frequency raster other than the second raster point. In some examples, the pull-in signal and the second pull-in signal may be staggered in at least one of frequency, time, or a combination thereof.

In one example, another apparatus for wireless communication at a wireless device is described. The apparatus may include a processor, memory in electronic communication with the processor, and instructions stored in the memory. The instructions may be executable by the processor to transmit a pull-in signal on a first raster point of a frequency raster identified for synchronization channel transmissions. The frequency raster may include a plurality of raster points in a radio frequency spectrum, and the pull-in signal may indicate a second raster point of the frequency raster on which the synchronization channel is transmitted. The instructions may also be executable by the processor to transmit the synchronization channel on the second raster point.

In some examples of the apparatus, the pull-in signal may indicate the second raster point relative to the first raster point. In some examples, the pull-in signal may indicate a timing of the synchronization channel. In some examples, the pull-in signal may indicate the timing of the synchronization channel relative to a second timing of the pull-in signal. In some examples, the pull-in signal may include a PI-PSS and a PI-SSS. In some examples, the PI-PSS may have a same duration as a PSS of the synchronization channel, and the PI-PSS and the PSS may include different sequences. In some examples, the pull-in signal may include a PIICH that indicates the second raster point. In some examples, the pull-in signal may include a PI-PSS and a PI-SSS that match a combination of PSS and SSS reserved to identify the pull-in signal. In some examples, the pull-in signal and the synchronization channel may be transmitted over a contention-based radio frequency spectrum, and the pull-in signal may be transmitted within a data burst for which the wireless device has gained access to the contention-based radio frequency spectrum. In some examples, the pull-in signal and the data burst may be transmitted over the contention-based radio frequency spectrum on a same transmission beam.

In some examples of the apparatus, the pull-in signal and the synchronization channel may be transmitted over a non-contention-based radio frequency spectrum, and the pull-in signal may be transmitted in at least one of an empty downlink data resource, an empty control resource, a resource that punctures a PDSCH, a resource that is rate-matched around by the PDSCH, or a combination thereof. In some examples, the instructions may be executable by the processor to transmit a plurality of instances of the synchronization channel. In these examples, the pull-in signal and the plurality of instances of the synchronization channel may be transmitted over a non-contention-based radio frequency spectrum, the pull-in signal may be frequency domain multiplexed with an instance of the synchronization channel, and the pull-in signal and the instance of the synchronization channel may be transmitted using a same transmission beam. In some examples, the instructions may be executable by the processor to transmit at least a second pull-in signal on a raster point of the frequency raster other than the second raster point. In some examples, the pull-in signal and the second pull-in signal may be staggered in at least one of frequency, time, or a combination thereof.

In one example, another computer program product including a non-transitory computer-readable medium is described. The non-transitory computer-readable medium may include instructions to transmit a pull-in signal on a first raster point of a frequency raster identified for synchronization channel transmissions. The frequency raster may include a plurality of raster points in a radio frequency spectrum, and the pull-in signal may indicate a second raster point of the frequency raster on which the synchronization channel is transmitted. The non-transitory computer-readable medium may also include instructions to transmit the synchronization channel on the second raster point.

In some examples of the non-transitory computer-readable medium, the pull-in signal may indicate the second raster point relative to the first raster point. In some examples, the pull-in signal may indicate a timing of the synchronization channel. In some examples, the pull-in signal may indicate the timing of the synchronization channel relative to a second timing of the pull-in signal.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The present disclosure describes techniques for transmitting or using a pull-in signal to locate a synchronization channel. In a legacy LTE network, a synchronization channel is transmitted every 5 milliseconds (ms). A UE may search for the synchronization channel to collect information needed to access the LTE network. In a LTE unlicensed (LTE-U) network, a synchronization channel may be transmitted every 40 ms. The transmission period of the synchronization channel is longer to be coexistence friendly with Wi-Fi networks. As a result, the initial acquisition time can be longer for a UE that performs an initial access procedure for a LTE-U network (e.g., the UE needs to monitor a raster point longer to test all timing hypotheses for synchronization channel transmission). To potentially decrease a UE's initial acquisition time, a network access device may transmit instances of a synchronization channel within data bursts for which the network access device has already gained access to a contention-based radio frequency spectrum.

In some wireless networks, such as a next generation, 5G, or NR network, there may be a reduced number of raster points in the frequency raster that indicates the possible raster points on which a synchronization channel may be transmitted (i.e., the set of raster points that a UE may have to search before locating a synchronization channel). This may reduce the UE's initial acquisition time (or average initial acquisition time). For a NR shared spectrum (NR-SS) network, the same frequency raster used for a NR network may be used, but similarly to a LTE-U network, the transmission period of the synchronization channel may be longer (i.e., synchronization channel transmissions may be more sparse). Further, in a NR-SS millimeter wave (mm-Wave) network, synchronization channel transmissions may be beamformed, thereby complicating a UE's synchronization channel search efforts and possibly increasing the UE's initial acquisition time (or average initial acquisition time).

A network access device may transmit pull-in signals to assist a UE in quickly locating a synchronization channel transmitted by the network access device, thereby decreasing the UE's initial acquisition time (or average initial acquisition time).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

Figure 1:
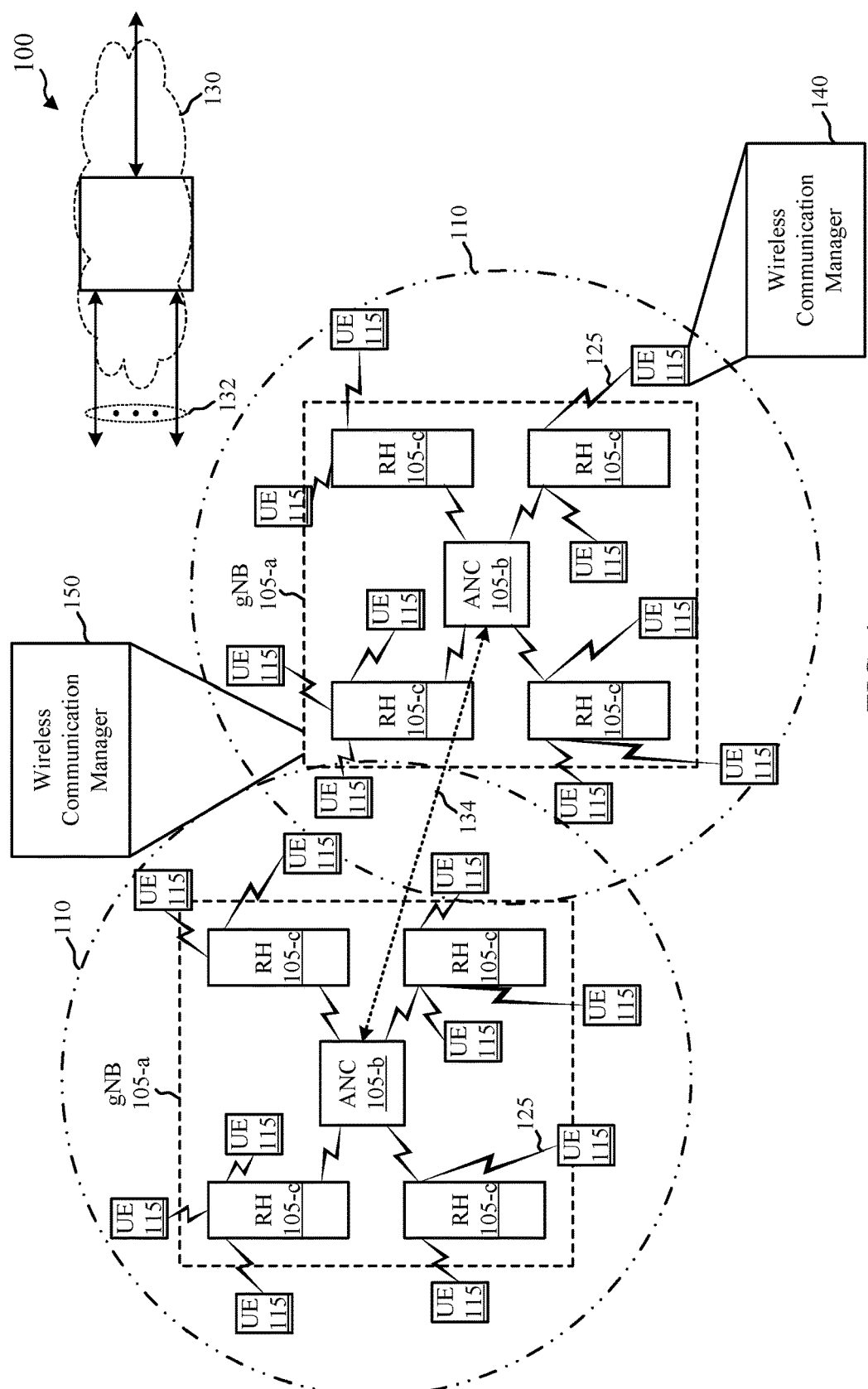
FIG. 1 shows an example of a wireless communication system, in accordance with various aspects of the present disclosure.

FIG. 1 shows an example of a wireless communication system 100, in accordance with various aspects of the present disclosure. The wireless communication system 100 may include network access devices 105 (e.g., gNBs 105-*a*, ANCs 105-*b*, and/or RHs 105-*c*), UEs 115, and a core network 130. The core network 130 may provide user authentication, access authorization, tracking, Internet Protocol (IP) connectivity, and other access, routing, or mobility functions. At least some of the network access devices 105 (e.g., gNBs 105-*a* or ANCs 105-*b*) may interface with the core network 130 through backhaul links 132 (e.g., S1, S2, etc.) and may perform radio configuration and scheduling for communication with the UEs 115. In various examples, the ANCs 105-*b* may communicate, either directly or indirectly (e.g., through core network 130), with each other over backhaul links 134 (e.g., X1, X2, etc.), which may be wired or wireless communication links. Each ANC 105-*b* may also communicate with a number of UEs 115 through a number of smart radio heads (e.g., RHs 105-*c*). In an alternative configuration of the wireless communication system 100, the functionality of an ANC 105-*b* may be provided by a RH 105-*c* or distributed across the RHs 105-*c* of an gNB 105-*a*. In another alternative configuration of the wireless communication system 100 (e.g., an LTE/LTE-A configuration), the RHs 105-*c* may be replaced with base stations, the ANCs 105-*b* may be replaced by base station controllers (or links to the core network 130), and the gNBs 105-*a* may be replaced by eNBs. In some examples, the wireless communication system 100 may include a mix of RHs 105-*c*, base stations, and/or other network access devices 105 for receiving/transmitting communications according to different radio access technologies (RATs) (e.g., LTE/LTE-A, 5G, Wi-Fi, etc.).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. A gNB may support one or multiple (e.g., two, three, four, and the like) cells (e.g., component carriers).

The wireless communication system 100 may support synchronous or asynchronous operation. For synchronous operation, the gNBs 105-*a* and/or RHs 105-*c* may have similar frame timing, and transmissions from different gNBs 105-*a* and/or RHs 105-*c* may be approximately aligned in time. For asynchronous operation, the gNBs 105-*a* and/or RHs 105-*c* may have different frame timings, and transmissions from different gNBs 105-*a* and/or RHs 105-*c* may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a RH 105-c, ANC 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, etc. A UE 115 may be able to communicate with various types of network access devices 105 (e.g., gNBs 105-a, RHs 105-c, eNBs, base stations, access points, macro gNBs, small cell gNBs, relay base stations, and the like. A UE 115 may also be able to communicate directly with other UEs 115 (e.g., using a peer-to-peer (P2P) protocol).

The communication links 125 shown in wireless communication system 100 may include uplinks (ULs) from a UE 115 to a RH 105-c, and/or downlinks (DLs), from a RH 105-c to a UE 115. The downlinks may also be called forward links, while the uplinks may also be called reverse links. Control information and data may be multiplexed on an uplink or downlink according to various techniques. Control information and data may be multiplexed on an uplink or downlink, for example, using TDM techniques, FDM techniques, or hybrid TDM-FDM techniques.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing techniques (e.g., using unpaired spectrum resources). Frame structures for FDD (e.g., frame structure type 1) and TDD (e.g., frame structure type 2) may be defined.

In some examples of the wireless communication system 100, network access devices 105 (e.g., RHs 105-c) and UEs 115 may include multiple antennas for employing antenna diversity schemes to improve communication quality and reliability between network access devices 105 and UEs 115. Additionally or alternatively, network access devices and UEs 115 may employ multiple-input, multiple-output (MIMO) techniques that may take advantage of multi-path environments to transmit multiple spatial layers carrying the same or different coded data. In some cases, signal processing techniques such as beamforming (i.e., directional transmission) may be used with MIMO techniques to coherently combine signal energies and overcome the path loss in specific beam directions. Precoding (e.g., weighting transmissions on different paths or layers, or from different antennas) may be used in conjunction with MIMO or beamforming techniques.

In some examples, the wireless communication system 100 may support operation over a non-contention-based radio frequency spectrum (e.g., a radio frequency spectrum licensed to particular users for particular uses) or a contention-based radio frequency spectrum (e.g., a radio frequency spectrum that is available for Wi-Fi use, a radio frequency spectrum that is available for use by different radio access technologies, or a radio frequency spectrum that is available for use by multiple MNOs in an equally shared or prioritized manner). In some examples, the wireless communication system 100 may support operation over a sub-6 GHz radio frequency spectrum (e.g., a LTE/LTE-A radio frequency spectrum or a Wi-Fi radio frequency spectrum) or a mmWave radio frequency spectrum.

Before transmitting over a channel (or cell) of a contention-based radio frequency spectrum, a UE 115 may contend for access to the channel using a Listen-Before-Talk (LBT) procedure. Depending on the outcome of the LBT procedure, the UE 115 may or may not be able to transmit over the channel. When the UE 115 determines the channel may be used (e.g., when the UE 115 determines the energy on the channel is below a threshold and "clear"), the UE 115 may transmit over the channel.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

At times, a UE 115 may perform an initial access (or initial acquisition) procedure with a network access device 105. When performing the initial access procedure, the UE 115 may search for a synchronization channel transmitted by the network access device 105. The synchronization channel may include information synchronizing the UE 115 with the network access device 105, so that the UE 115 may communicate with the network access device 105. In accordance with techniques described in the present disclosure, a network access device 105 may transmit pull-in signals that enable UEs 115 to locate the network access device's synchronization channel more quickly.

In some examples, a UE 115 may include a wireless communication manager 140. The wireless communication manager 140 may be used by the UE 115 to search for a synchronization channel on a first raster point of a frequency raster identified for synchronization channel transmissions. The frequency raster may include a plurality of raster points in a radio frequency spectrum. The wireless communication manager 140 may also be used by the UE 115 to identify a pull-in signal on the first raster point, to determine, from the pull-in signal, a second raster point of the frequency raster on which the synchronization channel is transmitted, and to receive the synchronization channel on the second raster point.

In some examples, a network access device 105 may include a wireless communication manager 150. The wireless communication manager 150 may be used by the network access device 105 to transmit a pull-in signal on a first raster point of a frequency raster identified for synchronization channel transmissions. The frequency raster may include a plurality of raster points in a radio frequency spectrum, and the pull-in signal may indicate a second raster point of the frequency raster on which the synchronization channel is transmitted. The wireless communication manager 150 may also be used by the network access device 105 to transmit the synchronization channel on the second raster point.

Figure 2:
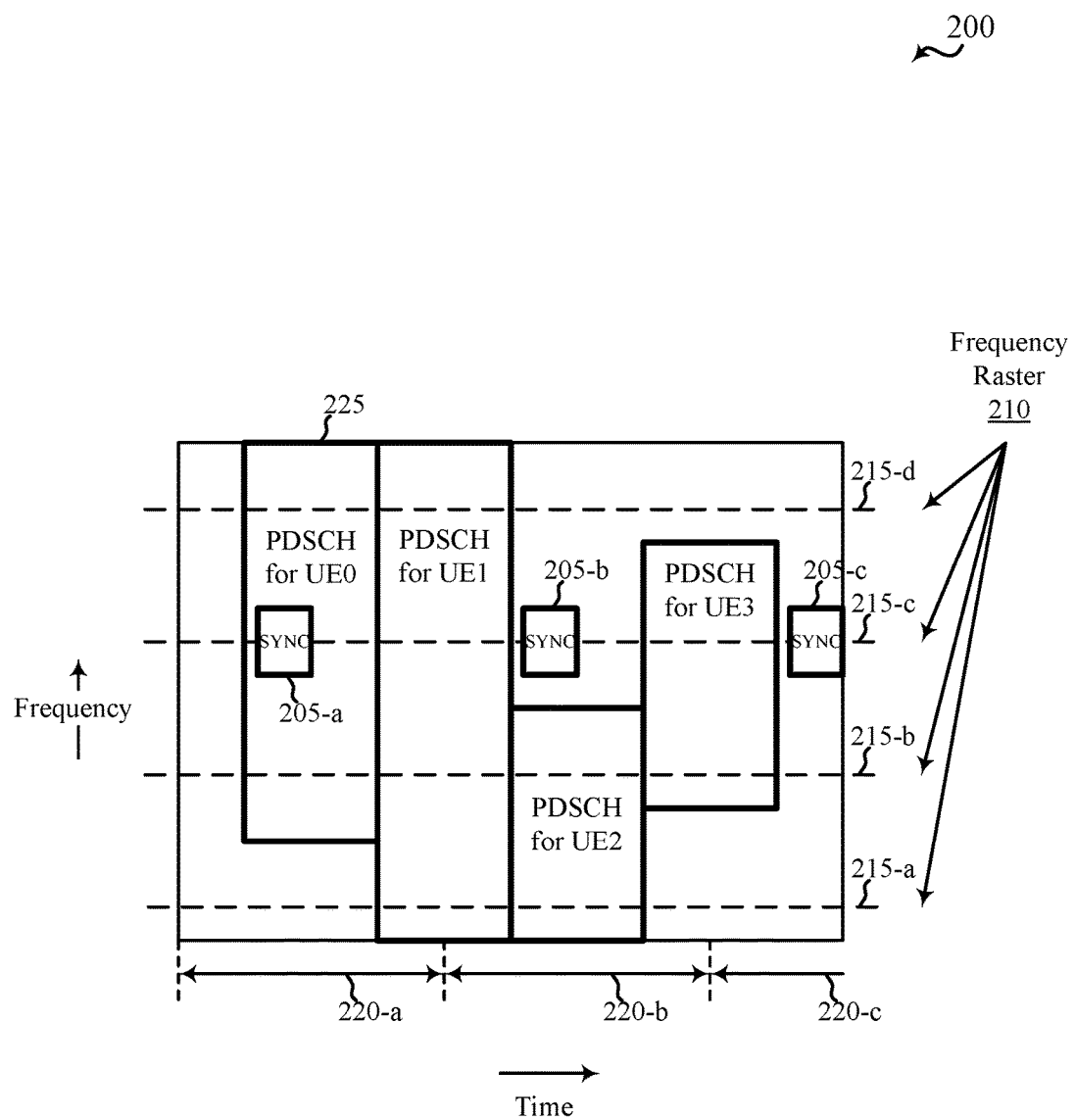
FIG. 2 illustrates a transmission of a synchronization channel with respect to time and frequency, in accordance with various aspects of the present disclosure.

FIG. 2 illustrates a transmission of a synchronization channel with respect to time and frequency, in accordance with various aspects of the present disclosure. More specifically, FIG. 2 illustrates periodic transmission of a synchronization channel 205. By way of example, the periodically transmitted synchronization channel 205 may include a first instance of the synchronization channel 205-a, a second instance of the synchronization channel 205-b, and a third instance of the synchronization channel 205-c.

In some examples, a network (or network access device) may identify a frequency raster 210 for synchronization channel transmissions. The frequency raster 210 may include a plurality of raster points 215 (e.g., frequency sub-bands or frequency tones) from which the network (or network access device) may select a raster point (or points) on which to transmit a synchronization channel 205. By way of example, the frequency raster 210 is shown to include a first raster point 215-a, a second raster point 215-b, a third raster point 215-c, and a fourth raster point 215-d. The network (or network access device) may also select a timing of the synchronization channel 205. In some examples, and as shown in FIG. 2, the network (or network access device) may select a semi-static raster point and timing, including a time interval, for periodic transmission of a synchronization channel 205. In other examples, the network (or network access device) may dynamically select one or more raster points and timings for synchronization channel transmissions, and may or may not transmit a synchronization channel periodically.

A UE may be configured with the details of the frequency raster 210 prior to accessing the network including the network access device, and may blindly search for the synchronization channel 205 on one or more of the raster points 215 of the frequency raster 210. In one example, the UE may begin searching for the synchronization channel 205 on the first raster point 215-a. After searching for the synchronization channel 205 on the first raster point 215-a for a predetermined time period 220-a (e.g., a time period that is long enough to test all synchronization channel timing hypotheses), and not finding the synchronization channel 205, the UE may continue searching for the synchronization channel 205 on the second raster point 215-b. After searching for the synchronization channel 205 on the second raster point 215-b for a predetermined time period 220-b, and not finding the synchronization channel 205, the UE may continue searching for the synchronization channel 205 on the third raster point 215-c. After searching for the synchronization channel 205 on the third raster point 215-c for part of a predetermined time period 220-c, the UE may locate the third instance of the synchronization channel 205-c, and may obtain (from the third instance of the synchronization channel 205-c) synchronization information for accessing the network through the network access device.

Although the frequency raster 210 may limit the frequencies that a UE needs to search for a synchronization channel, blindly searching the raster points 215 of the frequency raster 210 for synchronization channel transmissions can increase a UE's initial acquisition time (or average initial acquisition time) and may be inefficient. As the number of raster points in a frequency raster increases, so too is a UE's initial acquisition time (or average initial acquisition time) increased. When the frequency raster includes raster points in a contention-based radio frequency spectrum, a UE's initial acquisition time (or average initial acquisition time) may also be increased by channel access delays (e.g., LBT procedures that are performed without gaining access to the shared radio frequency spectrum). When the frequency raster includes raster points in a mmWave channel, a UE's initial acquisition time (or average initial acquisition time) may also be increased as a result of multiple beamforming hypotheses that the UE needs to test.

As shown in FIG. 2, some instances of the synchronization channel 205 may be transmitted during a data burst to a UE (e.g., the first instance of the synchronization channel 205-a may be transmitted during a PDSCH 225 transmitted to UE0). Other instances of the synchronization channel 205 (e.g., the second instance of the synchronization channel 205-b and the third instance of the synchronization channel 205-c) may be transmitted outside data bursts.

Figure 3:
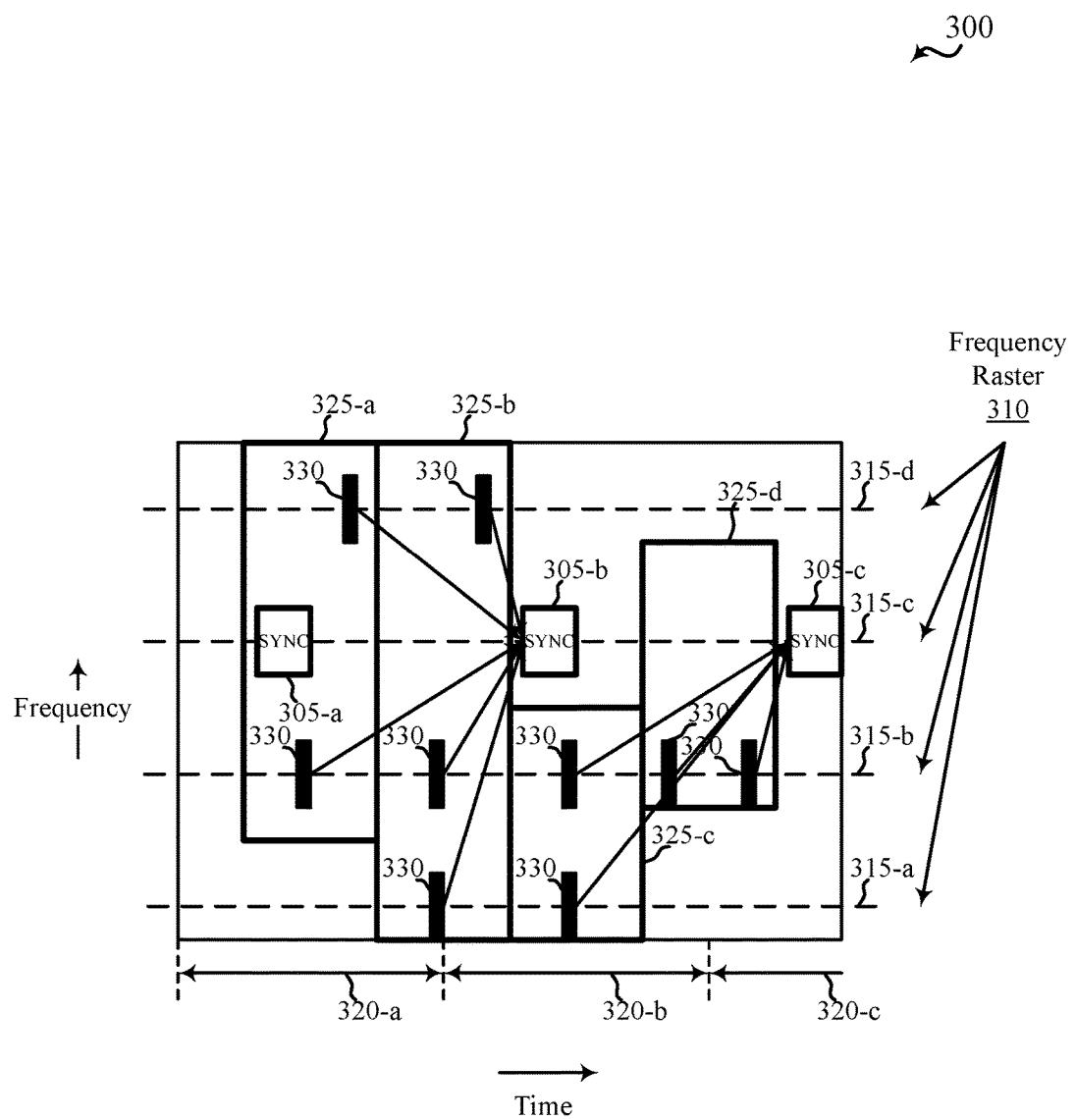
FIG. 3 illustrates a transmission of pull-in signals and a synchronization channel with respect to time and frequency, in accordance with various aspects of the present disclosure.

FIG. 3 illustrates a transmission of pull-in signals and a synchronization channel with respect to time and frequency, in accordance with various aspects of the present disclosure. More specifically, FIG. 3 illustrates periodic transmission of a synchronization channel 305. By way of example, the periodically transmitted synchronization channel 305 may include a first instance of the synchronization channel 305-a, a second instance of the synchronization channel 305-b, and a third instance of the synchronization channel 305-c.

In some examples, a network (or network access device) may identify a frequency raster 310 for synchronization channel transmissions. The frequency raster 310 may include a plurality of raster points 315 (e.g., frequency sub-bands or frequency tones) from which the network (or network access device) may select a raster point (or points) on which to transmit a synchronization channel 305. By way of example, the frequency raster 310 is shown to include a first raster point 315-a, a second raster point 315-b, a third raster point 315-c, and a fourth raster point 315-d. The network (or network access device) may also select a timing of the synchronization channel 305. In some examples, and as shown in FIG. 3, the network (or network access device) may select a semi-static raster point and timing, including a time interval, for periodic transmission of a synchronization channel 305. In other examples, the network (or network access device) may dynamically select one or more raster points and timings for synchronization channel transmissions, and may or may not transmit a synchronization channel periodically.

In addition to selecting the parameters of the synchronization channel 305, and transmitting the synchronization channel 305, the network (or network access device) may select parameters (e.g., one or more raster points 315 or timings) for transmitting one or more pull-in signals 330. By way of example, FIG. 3 shows transmissions of pull-in signals 330 on each raster point 315 but for the raster point 315 on which the synchronization channel 305 is transmitted. FIG. 3 also shows transmissions of pull-in signals 330 in each time period 320 of a plurality of time periods 320. However, transmissions of pull-in signals 330 are limited to raster points 315 included within data bursts transmitted to UEs (e.g., a first PDSCH 325-a transmitted to UE0, a second PDSCH 325-b transmitted to UE1, a third PDSCH 325-c transmitted to UE2, and a fourth PDSCH 325-d transmitted to UE3). In alternative examples, pull-in signals 330 may be transmitted on fewer raster points. Pull-in signals may also or alternatively be transmitted in fewer than all time periods 320, and/or within or outside data bursts transmitted to UEs.

In some examples, a pull-in signal 330 may include a waveform similar to the waveform of a synchronization channel 305, so that a pull-in signal 330 may be identified using the same search component(s) and algorithm(s) used to search for the synchronization channel transmissions. In some examples, a pull-in signal 330 may indicate a location of the synchronization channel 305 (e.g., a location of a next instance of the synchronization channel), and may be associated with less overhead and a lower cost than a synchronization channel transmission.

A pull-in signal 330 may indicate a location of a synchronization channel 305. In some examples, a pull-in signal 330 may indicate a raster point on which the synchronization channel 305 is transmitted. In some examples, a raster point may be indicated relative to a raster point on which the pull-in signal 330 is transmitted (e.g., as an offset). In some examples, a pull-in signal may also indicate a timing of the synchronization channel 305 (e.g., a timing of a next instance of the synchronization channel 305). In some examples, a timing of the synchronization channel 305 may be indicated relative to a timing of the pull-in signal 330.

A UE may be configured with the details of the frequency raster 310 prior to accessing the network including the network access device, and may blindly search for the synchronization channel 305 on one or more of the raster points 315 of the frequency raster 310. In one example, the UE may begin searching for the synchronization channel 305 on the first raster point 315-a. After searching for the synchronization channel 305 on the first raster point 315-a for a part of a predetermined time period 320-a (e.g., a time period that is long enough to test all synchronization channel timing hypotheses), the UE may identify a pull-in signal 330, and may determine, from the pull-in signal 330, a raster point on which the synchronization channel 305 is transmitted. In some examples, the UE may also determine, from the pull-in signal 330, a timing of the synchronization channel 305. When the pull-in signal 330 indicates a raster point but not a timing of the synchronization channel 305, the UE may search for the synchronization channel 305 on the indicated raster point during a next predetermined time period 320-b. When the pull-in signal 330 indicates a timing of the synchronization channel 305, the UE may transition to a power saving state after determining the timing of the synchronization channel 305, and may transition from the power saving state to an awake state based at least in part on the timing of the synchronization channel 305.

When a pull-in signal 330 is transmitted in a contention-based radio frequency spectrum (e.g., a sub-6 GHz contention-based radio frequency spectrum or a mmWave contention-based radio frequency spectrum), the pull-in signal 330 may be transmitted within a data burst transmitted to a UE, on a raster point and during a time period for which a network access device has gained access to the contention-based radio frequency spectrum for the purpose of transmitting the data burst. In this manner, a network access device may not have to perform a LBT procedure just to transmit a pull-in signal 330. When a pull-in signal 330 is transmitted in a non-contention-based radio frequency spectrum, the pull-in signal 330 may be transmitted inside or outside a data burst, without incurring the overhead or delay of performing a LBT procedure.

When transmissions are made in a mmWave radio frequency spectrum, the transmissions may be beamformed. Thus, when a pull-in signal 330 is transmitted within a data burst in a mmWave contention-based radio frequency spectrum, the pull-in signal 330 may be beamformed using a same transmission beam used for the data burst. This may limit opportunistic use of the pull-in signal 330 to UEs configured to communicate on the same transmission beam used for the data burst (or to UEs that scan for the transmission beam on which the pull-in signal 330 is transmitted). A pull-in signal 330 may also be transmitted using a same transmission beam as a data burst that includes the pull-in signal 330 in other scenarios in which transmissions are beamformed.

When a pull-in signal 330 is transmitted in a non-contention-based radio frequency spectrum, (e.g., a sub-6 GHz contention-based radio frequency spectrum or a mmWave contention-based radio frequency spectrum), the pull-in signal 330 may be transmitted, for example, in an empty downlink data resource (e.g., a downlink data resource not included in a downlink grant to a UE for receiving a PDSCH), an empty control resource (e.g., a resource not occupied by control subbands), a resource that punctures a PDSCH, a resource that is rate-matched around by a PDSCH, or a combination thereof. Transmitting a pull-in signal 330 in an empty downlink data resource may avoid a need to puncture a PDSCH or rate-match around the pull-in signal 330, but may interfere with PDSCH transmissions of other network access devices (e.g., cause bursty interference for the PDSCH transmissions of the other network access devices). Transmitting a pull-in signal 330 in an empty control resource may not cause bursty interference for the PDSCH transmissions of other network access devices. When transmitting a pull-in signal 330 in a resource that punctures a PDSCH, or in a resource that is rate-matched around by a PDSCH, an indication of the pull-in signal's location may need to be provided to UEs. The indication of the pull-in signal's location may be provided, for example, in a RRC configuration or in downlink control information (DCI).

When transmissions made in a radio frequency spectrum (e.g., a mmWave radio frequency spectrum) are beamformed, a pull-in signal 330 may be frequency domain multiplexed with an instance of the synchronization channel 305, and the pull-in signal 330 and synchronization channel 305 may be transmitted at the same time using the same transmission beam.

Figure 4:
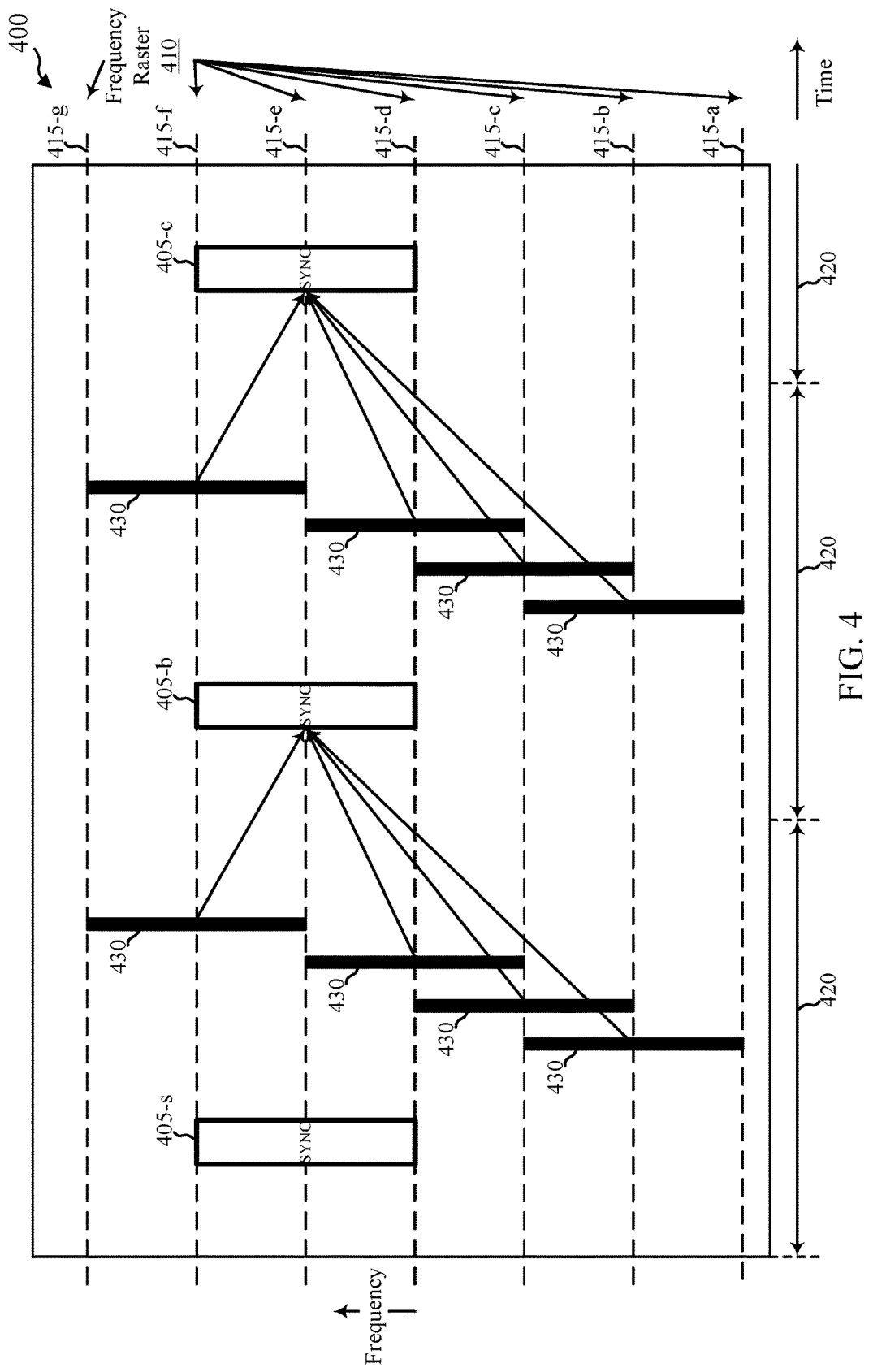
FIG. 4 illustrates a transmission of pull-in signals and a synchronization channel with respect to time and frequency, in accordance with various aspects of the present disclosure.

FIG. 4 illustrates a transmission of pull-in signals and a synchronization channel with respect to time and frequency, in accordance with various aspects of the present disclosure. More specifically, FIG. 4 illustrates periodic transmission of a synchronization channel 405. By way of example, the periodically transmitted synchronization channel 405 may include a first instance of the synchronization channel 405-a, a second instance of the synchronization channel 405-b, and a third instance of the synchronization channel 405-c.

In some examples, a network (or network access device) may identify a frequency raster 410 for synchronization channel transmissions. The frequency raster 410 may include a plurality of raster points 415 (e.g., frequency sub-bands or frequency tones) from which the network (or network access device) may select a raster point (or points) on which to transmit a synchronization channel 405. By way of example, the frequency raster 410 is shown to include a first raster point 415-a, a second raster point 415-b, a third raster point 415-c, a fourth raster point 415-d, a fifth raster point 415-e, a sixth raster point 415-f, and a seventh raster point 415-g. The network (or network access device) may also select a timing of the synchronization channel 405. In some examples, and as shown in FIG. 4, the network (or network access device) may select a semi-static raster point and timing, including a time interval, for periodic transmission of a synchronization channel 405. In other examples, the network (or network access device) may dynamically select one or more raster points and timings for synchronization channel transmissions, and may or may not transmit a synchronization channel periodically.

In addition to selecting the parameters of the synchronization channel 405, and transmitting the synchronization channel 405, the network (or network access device) may select parameters (e.g., one or more raster points 415 or timings) for transmitting one or more pull-in signals 430. By way of example, FIG. 4 shows transmissions of pull-in signals 430 on some raster points 415, but not other raster points 415. FIG. 4 also shows transmissions of pull-in signals 430 in each time period 420 of a plurality of time periods 420. In alternative examples, pull-in signals 430 may be transmitted on more or fewer raster points. Pull-in signals may also or alternatively be transmitted in fewer than all time periods 420.

In FIG. 4, instances of the pull-in signal 430 may be transmitted so that the pull-in signals 430 are staggered in time (as well as frequency). Pull-in signals 430 may be staggered in time when the bandwidth of the pull-in signals 430 is greater than a raster point spacing (i.e., the raster step size). For example, when the raster point spacing is 1.8 MHz, but the bandwidth of the synchronization channel 405 is 5 MHz, a 5 MHz pull-in signals may not be transmitted at the same time without frequency overlap, but may be triggered without frequency overlap when transmitted at staggered transmission times (e.g., the pull-in signals 430 may be time domain multiplexed instead of frequency domain multiplexed).

Figure 5:
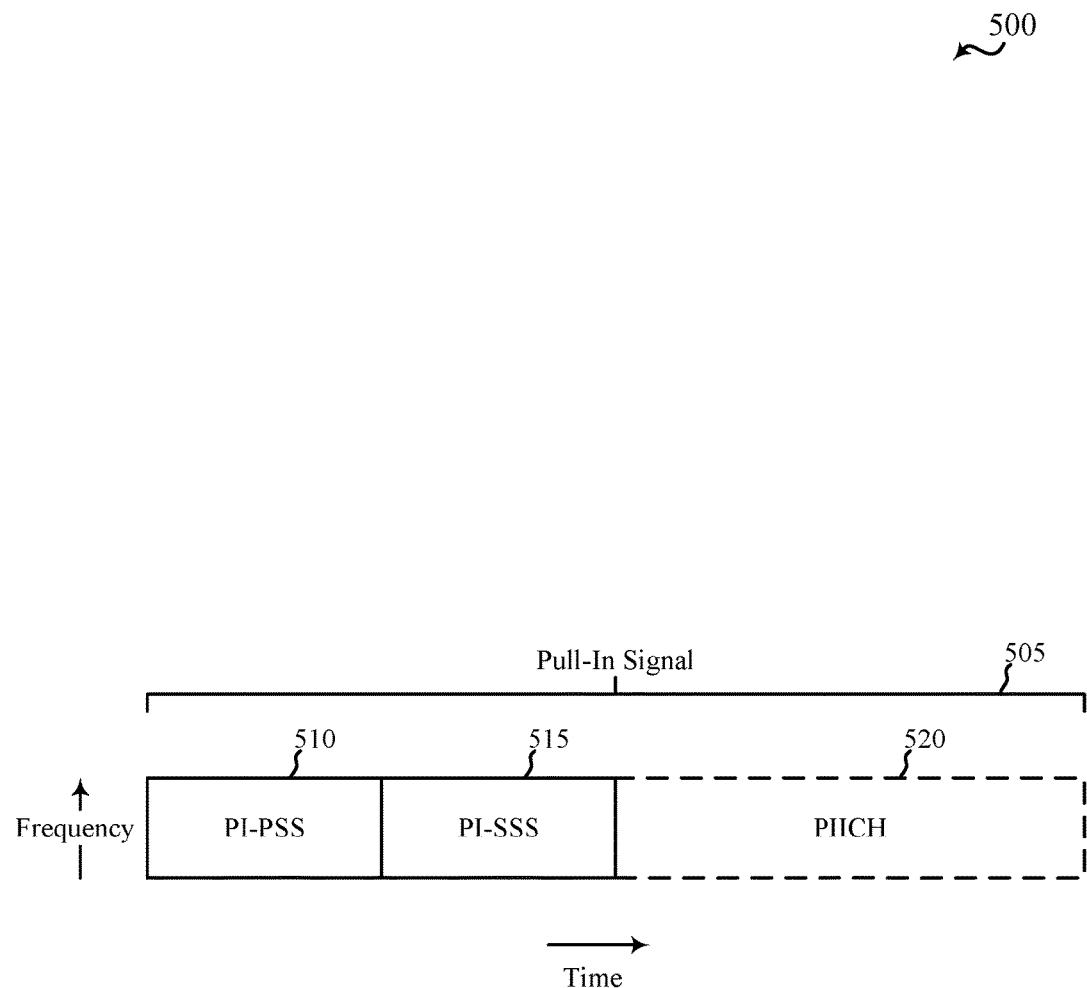
FIG. 5 shows an example structure of a pull-in signal, in accordance with various aspects of the present disclosure.

FIG. 5 shows an example structure 500 of a pull-in signal 505, in accordance with various aspects of the present disclosure. The structure 500 may include a PI-PSS 510, a PI-SSS 515, and an optional PIICH 520, and in some examples may be configured to be identified using the same search component(s) and algorithm(s) used to search for a synchronization channel transmissions.

In some examples, the PI-PSS 510 may have a same duration (or length) as a PSS of a synchronization channel, but may include a different sequence when compared to a PSS. A UE may use a same cross-correlator to identify (or detect) a PSS and the PI-PSS 510, but may cross-correlate the PI-PSS 510 to a different known sequence (e.g., a sequence reserved for indicating a pull-in signal). In some examples, the PI-SSS 515 may not carry any information, but may include a fixed known sequence that a UE may use as a phase reference to demodulate/decode the PIICH 520. In some examples, the PIICH 520 may be similar to a physical broadcast channel (PBCH) (e.g., the PIICH 520 may have a same structure, coding, etc. as a PBCH), and may carry information about the location of a synchronization channel.

In some examples, the PI-PSS 510 and PI-SSS 515 may be configured to match a combination of PSS and SSS reserved to identify a pull-in signal. In these examples, the PI-SSS 515 may also be used (by a UE) as a phase reference to demodulate/decode the PIICH 520, which may carry information about the location of a synchronization channel. Alternatively, the combination of PI-PSS 510 and PI-SSS 515 may match one of a plurality of combinations of PSS and SSS reserved to identify different synchronization channel locations.

Figure 6:
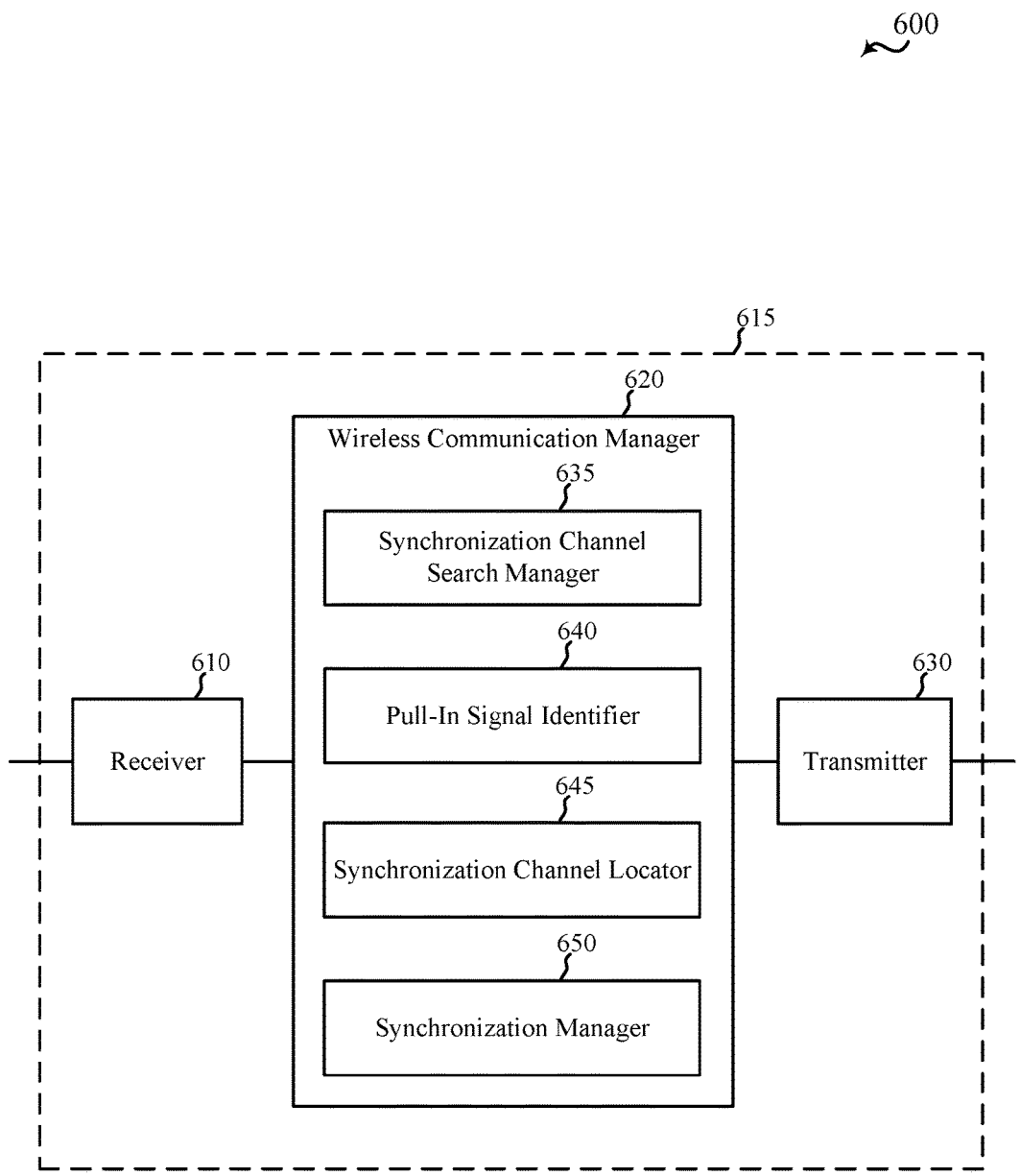
FIG. 6 shows a block diagram of an apparatus for use in wireless communication, in accordance with various aspects of the present disclosure.

FIG. 6 shows a block diagram 600 of an apparatus 615 for use in wireless communication, in accordance with various aspects of the present disclosure. The apparatus 615 may be an example of aspects of one or more of the UEs described with reference to FIG. 1. The apparatus 615 may also be or include a processor. The apparatus 615 may include a receiver 610, a wireless communication manager 620, or a transmitter 630. Each of these components may be in communication with each other.

The components of the apparatus 615 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 610 may include at least one radio frequency (RF) receiver, such as at least one RF receiver operable to receive transmissions over one or more radio frequency spectrum bands. In some examples, the one or more radio frequency spectrum bands may be used for communicating as described with reference to FIG. 1, 2, 3, 4, or 5. The receiver 610 may be used to receive various types of data or control signals (i.e., transmissions) over one or more communication links of a wireless communication system, such as one or more communication links of the wireless communication system 100 described with reference to FIG. 1.

In some examples, the transmitter 630 may include at least one RF transmitter, such as at least one RF transmitter operable to transmit over one or more radio frequency spectrum bands. In some examples, the one or more radio frequency spectrum bands may be used for communicating as described with reference to FIG. 1, 2, 3, 4, or 5. The transmitter 630 may be used to transmit various types of data or control signals (i.e., transmissions) over one or more communication links of a wireless communication system, such as one or more communication links of the wireless communication system 100 described with reference to FIG. 1.

In some examples, the wireless communication manager 620 may be used to manage one or more aspects of wireless communication for the apparatus 615. In some examples, part of the wireless communication manager 620 may be incorporated into or shared with the receiver 610 or the transmitter 630. In some examples, the wireless communication manager 620 may include a synchronization channel search manager 635, a pull-in signal identifier 640, a synchronization channel locator 645, or a synchronization manager 650.

The synchronization channel search manager 635 may be used to search for a synchronization channel on a first raster point of a frequency raster identified for synchronization channel transmissions. The frequency raster may include a plurality of raster points in a radio frequency spectrum. The pull-in signal identifier 640 may be used to identify a pull-in signal on the first raster point. The synchronization channel locator 645 may be used to determine, from the pull-in signal, a second raster point of the frequency raster on which the synchronization channel is transmitted. In some examples, the pull-in signal may indicate the second raster point relative to the first raster point. The synchronization manager 650 may be used to receive the synchronization channel on the second raster point.

Figure 7:
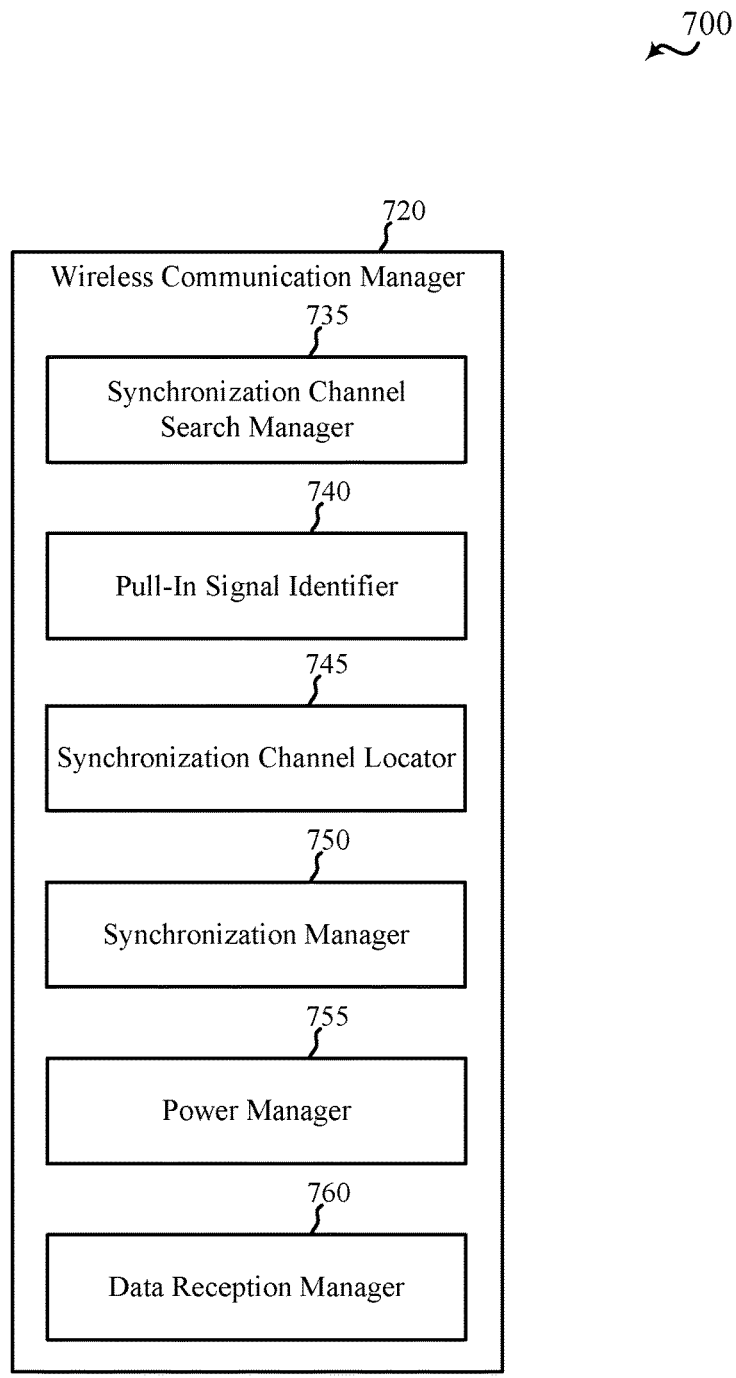
FIG. 7 shows a block diagram of a wireless communication manager for use in wireless communication, in accordance with various aspects of the present disclosure.

FIG. 7 shows a block diagram 700 of a wireless communication manager 720 for use in wireless communication, in accordance with various aspects of the present disclosure. The wireless communication manager 720 may be an example of aspects of the wireless communication manager described with reference to FIG. 6.

The components of the wireless communication manager 720 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 720 may be used to manage one or more aspects of wireless communication for a wireless device, such as one of the UEs or apparatuses described with reference to FIG. 1 or 6. In some examples, part of the wireless communication manager 720 may be incorporated into or shared with a receiver or a transmitter (e.g., the receiver 610 or the transmitter 630 described with reference to FIG. 6). In some examples, the wireless communication manager 720 may include a synchronization channel search manager 735, a pull-in signal identifier 740, a synchronization channel locator 745, a synchronization manager 750, a power manager 755, or a data reception manager 760.

The synchronization channel search manager 735 may be used to search for a synchronization channel on a first raster point of a frequency raster identified for synchronization channel transmissions. The frequency raster may include a plurality of raster points in a radio frequency spectrum. The radio frequency spectrum may include a non-contention-based radio frequency spectrum or a contention-based radio frequency spectrum.

The pull-in signal identifier 740 may be used to identify a pull-in signal on the first raster point. In some examples, the pull-in signal may include a PI-PSS and a PI-SSS, and the pull-in signal may be identified based at least in part on the PI-PSS. In some examples, the PI-PSS may have a same duration as a PSS of the synchronization channel, and the PI-PSS and the PSS may include different sequences. In some examples, the pull-in signal may further include a PIICH that indicates the second raster point. In some examples, the pull-in signal may include a PI-PSS and a PI-SSS, and the pull-in signal may be identified based at least in part on matching the PI-PSS and the PI-SSS to a combination of PSS and SSS reserved to identify a pull-in signal.

The synchronization channel locator 745 may be used to determine, from the pull-in signal, a second raster point of the frequency raster on which the synchronization channel is transmitted. In some examples, the pull-in signal may indicate the second raster point relative to the first raster point. The synchronization channel locator 745 may also be used to determine, from the pull-in signal, a timing of the synchronization channel. In some examples, the pull-in signal may indicate the timing of the synchronization channel relative to a second timing of the pull-in signal.

The synchronization manager 750 may be used to receive the synchronization channel on the second raster point.

The power manager 755 may be used to transition to a power saving state after (and if) the synchronization channel locator 745 determines the timing of the synchronization channel. The power manager 755 may also be used to transition from the power saving state to an awake state based at least in part on the timing of the synchronization channel.

The data reception manager 760 may be used to receive a data burst over the radio frequency spectrum. The radio frequency spectrum over which the data burst is received may include a non-contention-based radio frequency spectrum or a contention-based radio frequency spectrum. In some examples, the pull-in signal identifier 740 may identify the pull-in signal within the received data burst. In some examples, the pull-in signal may be identified, and the data burst may be received, over the contention-based radio frequency spectrum on a same transmission beam.

In some examples of the wireless communication manager 720, the pull-in signal may be identified using the pull-in signal identifier 740, and the synchronization channel may be received using the synchronization manager 750, over a non-contention-based radio frequency spectrum. In these examples, the pull-in signal may be identified, for example, in an empty downlink data resource, an empty control resource, a resource that punctures a PDSCH, a resource that is rate-matched around by the PDSCH, or a combination thereof.

Figure 8:
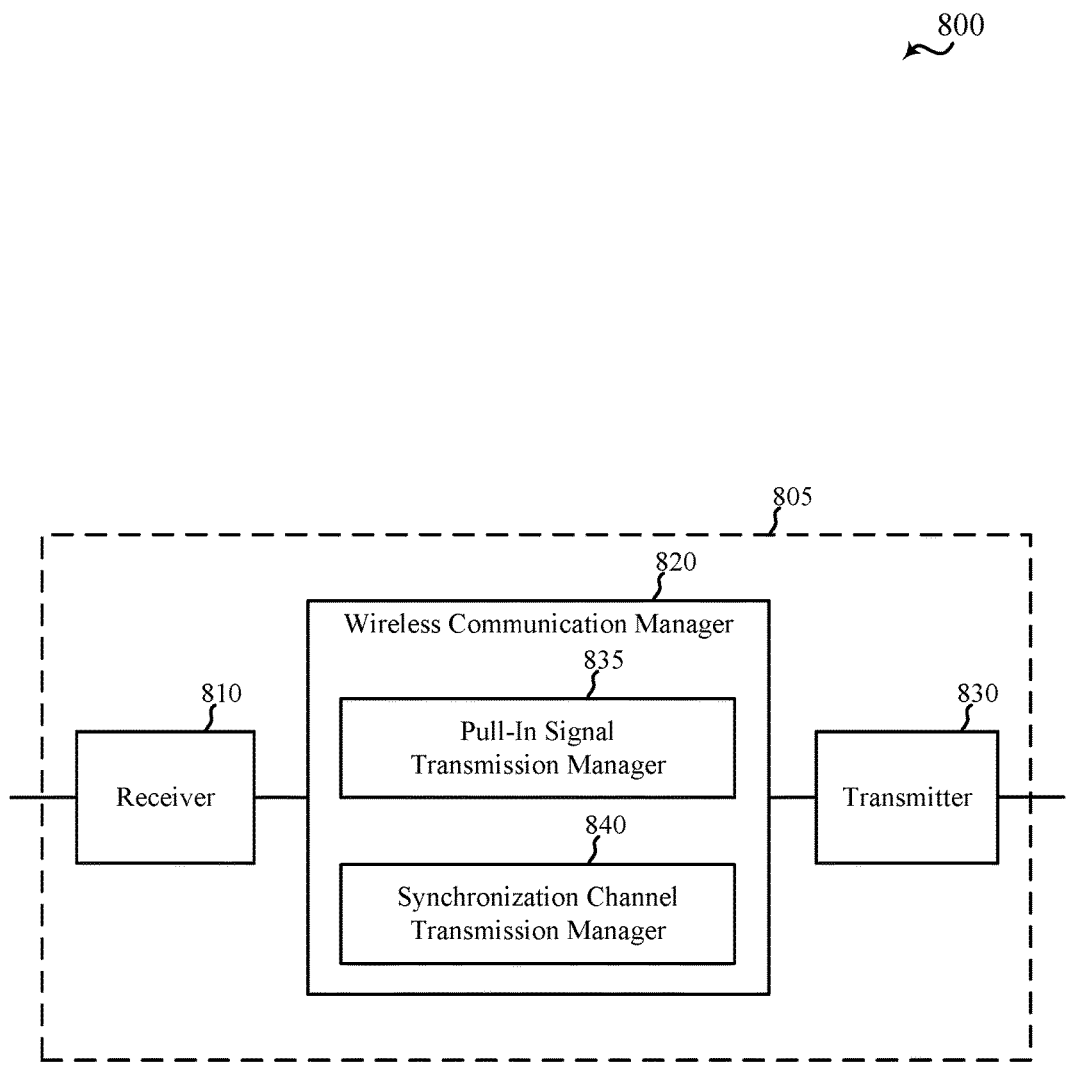
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. The apparatus 805 may be an example of aspects of one or more of the network access devices described with reference to FIG. 1. The apparatus 805 may also be or include a processor. The apparatus 805 may include a receiver 810, a wireless communication manager 820, or a transmitter 830. Each of these components may be in communication with each other.

The components of the apparatus 805 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 810 may include at least one RF receiver, such as at least one RF receiver operable to receive transmissions over one or more radio frequency spectrum bands. In some examples, the one or more radio frequency spectrum bands may be used for communicating as described with reference to FIG. 1, 2, 3, 4, or 5. The receiver 810 may be used to receive various types of data or control signals (i.e., transmissions) over one or more communication links of a wireless communication system, such as one or more communication links of the wireless communication system 100 described with reference to FIG. 1.

In some examples, the transmitter 830 may include at least one RF transmitter, such as at least one RF transmitter operable to transmit over one or more radio frequency spectrum bands. In some examples, the one or more radio frequency spectrum bands may be used for communicating as described with reference to FIG. 1, 2, 3, 4, or 5. The transmitter 830 may be used to transmit various types of data or control signals (i.e., transmissions) over one or more communication links of a wireless communication system, such as one or more communication links of the wireless communication system 100 described with reference to FIG. 1.

In some examples, the wireless communication manager 820 may be used to manage one or more aspects of wireless communication for the apparatus 805. In some examples, part of the wireless communication manager 820 may be incorporated into or shared with the receiver 810 or the transmitter 830. In some examples, the wireless communication manager 820 may include a pull-in signal transmission manager 835 or a synchronization channel transmission manager 840.

The pull-in signal transmission manager 835 may be used to transmit a pull-in signal on a first raster point of a frequency raster identified for synchronization channel transmissions. The frequency raster may include a plurality of raster points in a radio frequency spectrum. The pull-in signal may indicate a second raster point of the frequency raster on which the synchronization channel is transmitted. In some examples, the pull-in signal may indicate the second raster point relative to the first raster point. The synchronization channel transmission manager 840 may be used to transmit the synchronization channel on the second raster point.

Figure 9:
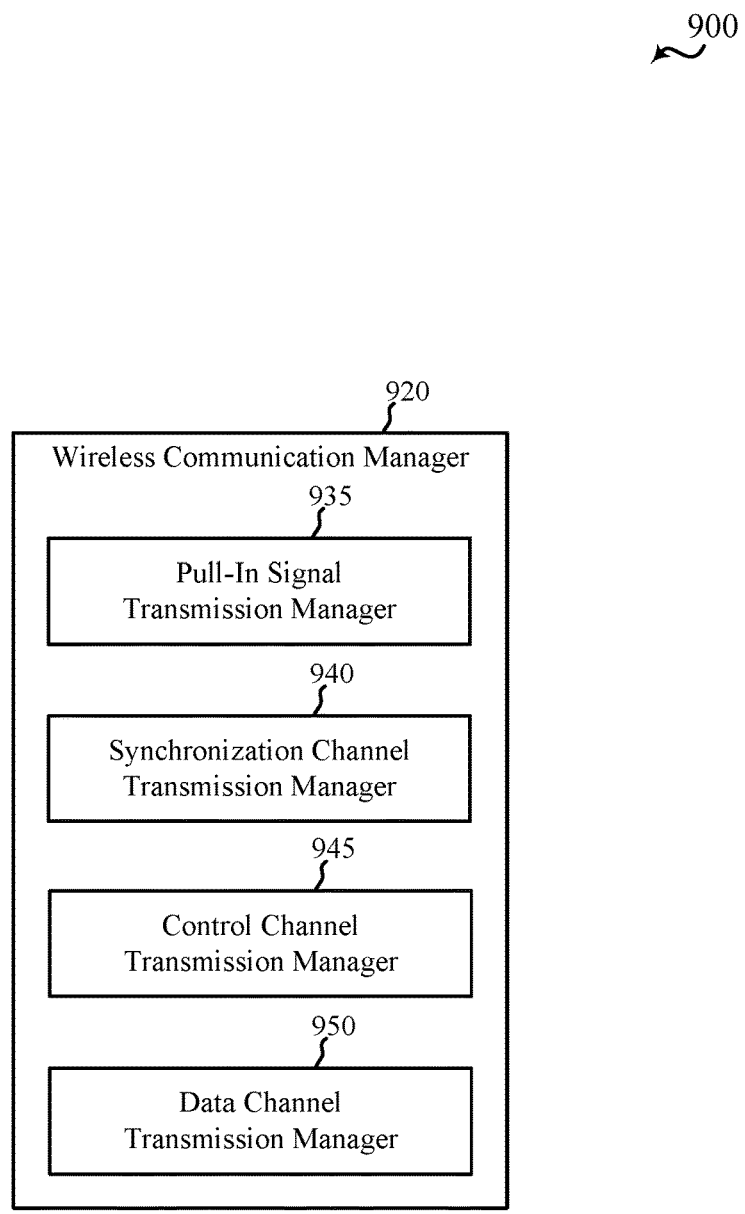
FIG. 9 shows a block diagram of a wireless communication manager for use in wireless communication, in accordance with various aspects of the present disclosure.

FIG. 9 shows a block diagram 900 of a wireless communication manager 920 for use in wireless communication, in accordance with various aspects of the present disclosure. The wireless communication manager 920 may be an example of aspects of the wireless communication manager described with reference to FIG. 8.

The components of the wireless communication manager 920 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 920 may be used to manage one or more aspects of wireless communication for a wireless device, such as one of the network access devices or apparatuses described with reference to FIG. 1 or 8. In some examples, part of the wireless communication manager 920 may be incorporated into or shared with a receiver or a transmitter (e.g., the receiver 810 or the transmitter 830 described with reference to FIG. 8). In some examples, the wireless communication manager 920 may include a pull-in signal transmission manager 935, a synchronization channel transmission manager 940, a control channel transmission manager 945, or a data channel transmission manager 950.

The pull-in signal transmission manager 935 may be used to transmit a pull-in signal on a first raster point of a frequency raster identified for synchronization channel transmissions. The frequency raster may include a plurality of raster points in a radio frequency spectrum. The pull-in signal may indicate a second raster point of the frequency raster on which the synchronization channel is transmitted. In some examples, the pull-in signal may indicate the second raster point relative to the first raster point. In some examples, the pull-in signal may further indicate a timing of the synchronization channel. In some examples, the pull-in signal may indicate the timing of the synchronization channel relative to a second timing of the pull-in signal. In some examples, the pull-in signal may include a PI-PSS and a PI-SSS. In some examples, the PI-PSS may have a same duration as a PSS of the synchronization channel, and the PI-PSS and the PSS may include different sequences. In some examples, the pull-in signal may further include a PIICH that indicates the second raster point. In some examples, the pull-in signal may include a PI-PSS and a PI-SSS that match a combination of PSS and SSS reserved to identify a pull-in signal.

In some examples of the wireless communication manager 920, the pull-in signal transmission manager 935 may be used to transmit at least a second pull-in signal on at least one raster point of the frequency raster. In some examples, the at least one raster point may include a raster point of the frequency raster other than the second raster point. In some examples, the pull-in signal and the second pull-in signal may be staggered in frequency, time, or a combination thereof.

The synchronization channel transmission manager 940 may be used to transmit the synchronization channel on the second raster point. The control channel transmission manager 945 may be used to transmit a data burst, PDSCH, or another downlink data channel. The data channel transmission manager 950 may be used to transmit a physical downlink control channel (PDCCH) or another downlink control channel.

In some examples of the wireless communication manager 920, the pull-in signal transmission manager 935 and the synchronization channel transmission manager 940 may be used to respectively transmit the pull-in signal and the synchronization channel over a contention-based radio frequency spectrum. In these examples, the pull-in signal may be transmitted within a data burst for which the wireless device has gained access to the contention-based radio frequency spectrum. In some examples, the pull-in signal and the data burst may be transmitted over the contention-based radio frequency spectrum on a same transmission beam.

In some examples of the wireless communication manager 920, the pull-in signal transmission manager 935 and the synchronization channel transmission manager 940 may be used to respectively transmit the pull-in signal and the synchronization channel over a non-contention-based radio frequency spectrum. In these examples, the pull-in signal may be transmitted, for example, in an empty downlink data resource, an empty control resource, a resource that punctures a PDSCH, a resource that is rate-matched around by the PDSCH, or a combination thereof.

In some examples of the wireless communication manager 920, the synchronization channel transmission manager 940 may be used to transmit a plurality of instances of the synchronization channel, and the pull-in signal and the plurality of instances of the synchronization channel may be transmitted over a non-contention-based radio frequency spectrum. In these examples, the pull-in signal may be frequency domain multiplexed with an instance of the synchronization channel, and the pull-in signal and the instance of the synchronization channel may be transmitted using a same transmission beam.

Figure 10:
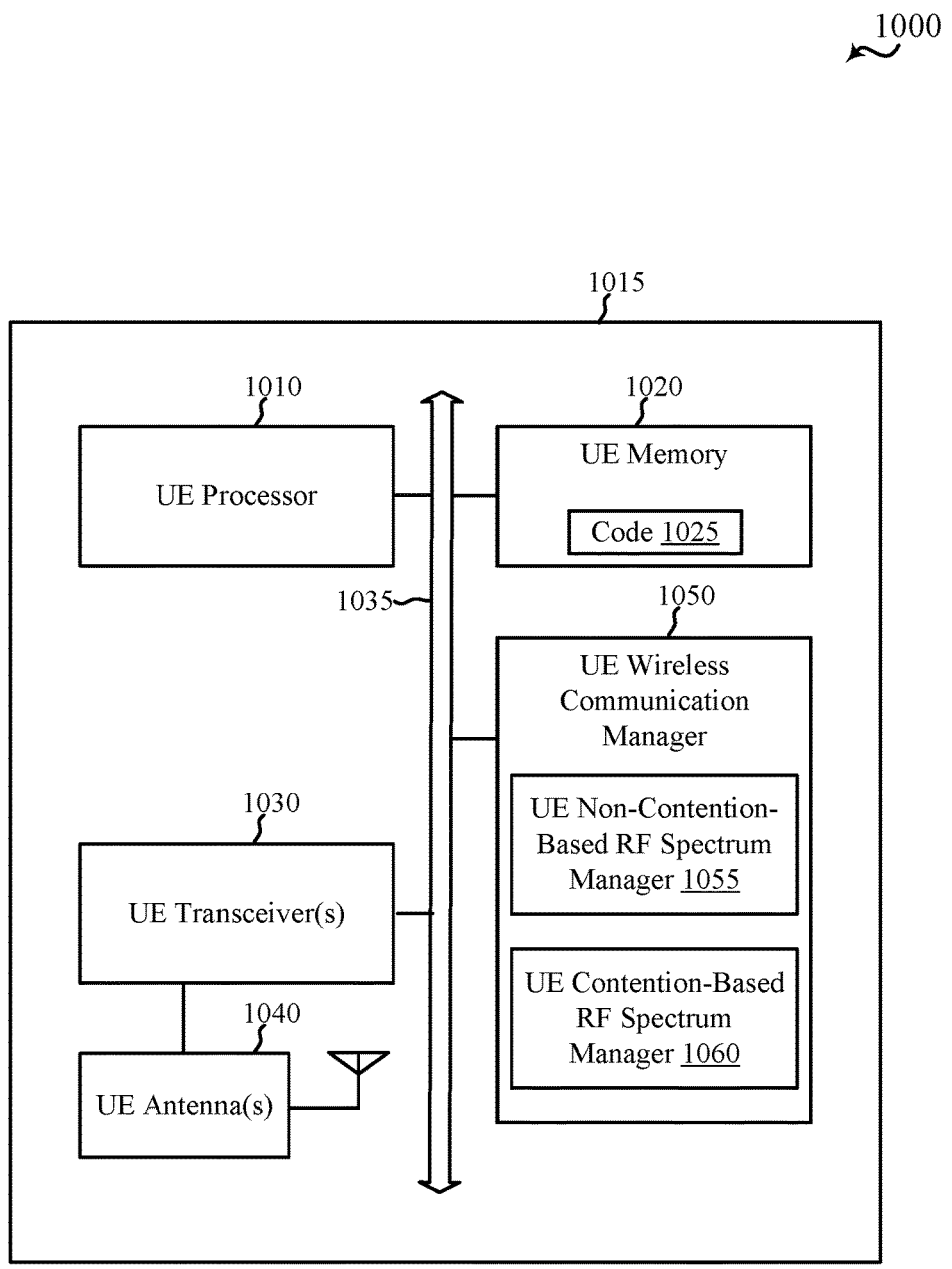
FIG. 10 shows a block diagram of a UE for use in wireless communication, in accordance with various aspects of the present disclosure.

FIG. 10 shows a block diagram 1000 of a UE 1015 for use in wireless communication, in accordance with various aspects of the present disclosure. The UE 1015 may be included or be part of a personal computer (e.g., a laptop computer, a netbook computer, a tablet computer, etc.), a cellular telephone, a PDA, a DVR, an internet appliance, a gaming console, an e-reader, etc. The UE 1015 may, in some examples, have an internal power supply (not shown), such as a small battery, to facilitate mobile operation. In some examples, the UE 1015 may be an example of aspects of one or more of the UEs described with reference to FIG. 1, or aspects of the apparatus described with reference to FIG. 6 or 7. The UE 1015 may be configured to implement at least some of the UE or apparatus techniques and functions described with reference to FIG. 1, 2, 3, 4, 5, 6, or 7.

The UE 1015 may include a UE processor 1010, a UE memory 1020, at least one UE transceiver (represented by UE transceiver(s) 1030), at least one UE antenna (represented by UE antenna(s) 1040), or a UE wireless communication manager 1050. Each of these components may be in communication with each other, directly or indirectly, over one or more buses 1035.

The UE memory 1020 may include random access memory (RAM) or read-only memory (ROM). The UE memory 1020 may store computer-readable, computer-executable code 1025 containing instructions that are configured to, when executed, cause the UE processor 1010 to perform various functions described herein related to wireless communication, including, for example, searching for a synchronization channel, identifying a pull-in signal, determining a location of the synchronization channel based at least in part on the pull-in signal, etc. Alternatively, the computer-executable code 1025 may not be directly executable by the UE processor 1010 but be configured to cause the UE 1015 (e.g., when compiled and executed) to perform various of the functions described herein.

The UE processor 1010 may include an intelligent hardware device, e.g., a central processing unit (CPU), a microcontroller, an ASIC, etc. The UE processor 1010 may process information received through the UE transceiver(s) 1030 or information to be sent to the UE transceiver(s) 1030 for transmission through the UE antenna(s) 1040. The UE processor 1010 may handle, alone or in connection with the UE wireless communication manager 1050, various aspects of communicating over (or managing communications over) a non-contention-based radio frequency spectrum or a contention-based radio frequency spectrum.

The UE transceiver(s) 1030 may include a modem configured to modulate packets and provide the modulated packets to the UE antenna(s) 1040 for transmission, and to demodulate packets received from the UE antenna(s) 1040. The UE transceiver(s) 1030 may, in some examples, be implemented as one or more UE transmitters and one or more separate UE receivers. The UE transceiver(s) 1030 may support communications in the non-contention-based radio frequency spectrum or the contention-based radio frequency spectrum. The UE transceiver(s) 1030 may be configured to communicate bi-directionally, via the UE antenna(s) 1040, with one or more network access devices or apparatuses, such as one or more of the network access devices described with reference to FIG. 1, or one or more of the apparatuses described with reference to FIG. 6. While the UE 1015 may include a single UE antenna, there may be examples in which the UE 1015 may include multiple UE antennas 1040.

The UE wireless communication manager 1050 may be configured to perform or control some or all of the UE or apparatus techniques or functions described with reference to FIG. 1, 2, 3, 4, 5, 6, or 7 related to wireless communication over the non-contention-based radio frequency spectrum or the contention-based radio frequency spectrum. The UE wireless communication manager 1050 may include a UE non-contention-based RF spectrum manager 1055 configured to handle communications in the non-contention-based radio frequency spectrum, and a UE contention-based RF spectrum manager 1060 configured to handle communications in the contention-based radio frequency spectrum. The UE wireless communication manager 1050, or portions of it, may include a processor, or some or all of the functions of the UE wireless communication manager 1050 may be performed by the UE processor 1010 or in connection with the UE processor 1010. In some examples, the UE wireless communication manager 1050 may be an example of the wireless communication manager described with reference to FIG. 1, 6, or 7.

Figure 11:
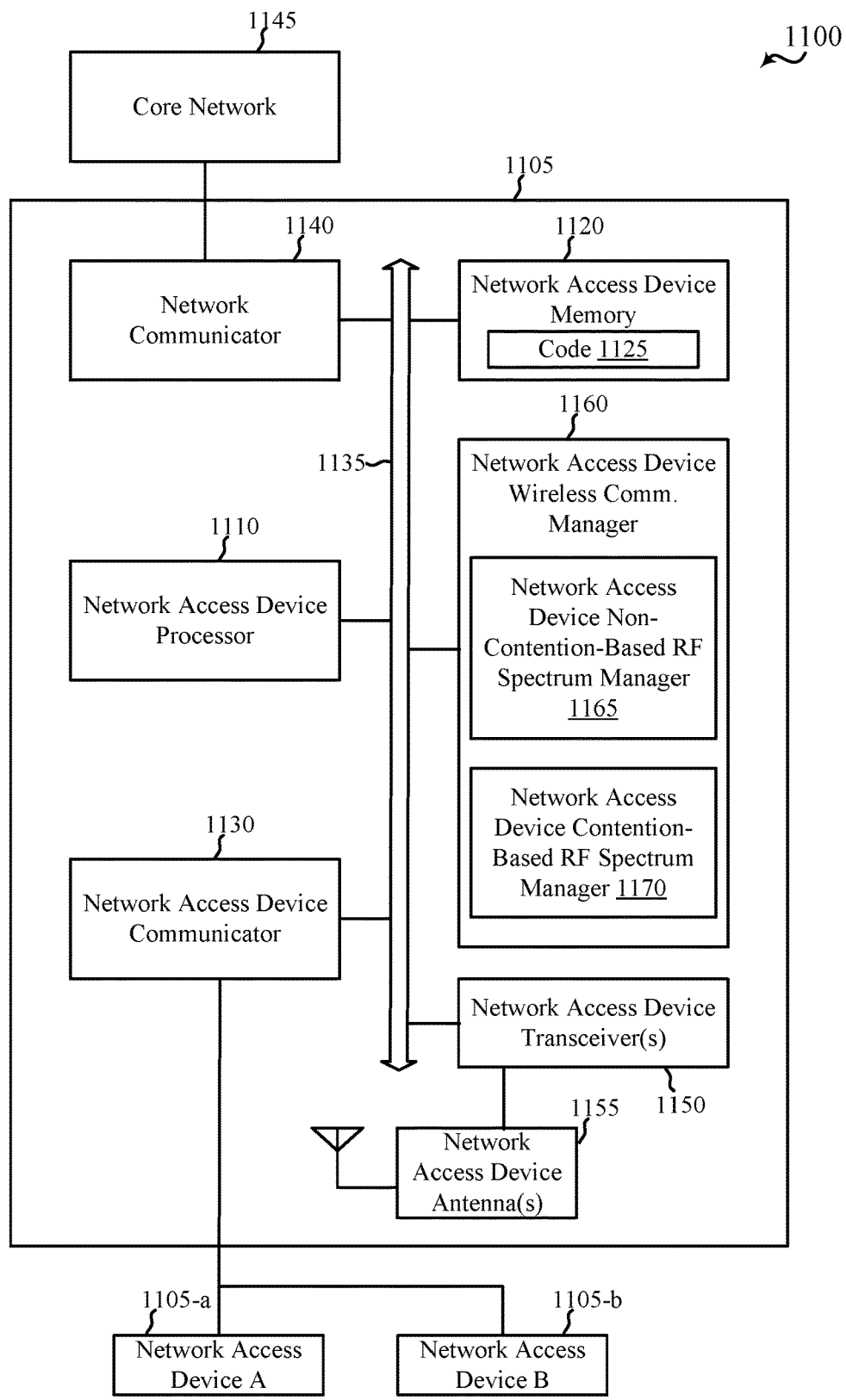
FIG. 11 shows a block diagram of a network access device for use in wireless communication, in accordance with various aspects of the present disclosure.

FIG. 11 shows a block diagram 1100 of a network access device 1105 for use in wireless communication, in accordance with various aspects of the present disclosure. In some examples, the network access device 1105 may be an example of one or more aspects of the network access devices described with reference to FIG. 1, or aspects of the apparatus described with reference to FIG. 8. The network access device 1105 may be configured to implement or facilitate at least some of the network access device, base station, or apparatus techniques and functions described with reference to FIG. 1, 2, 3, 4, 5, 8, or 9.

The network access device 1105 may include a network access device processor 1110, a network access device memory 1120, at least one network access device transceiver (represented by network access device transceiver(s) 1150), at least one network access device antenna (represented by network access device antenna(s) 1155), or a network access device wireless communication manager 1160. The network access device 1105 may also include one or more of a network access device communicator 1130 or a network communicator 1140. Each of these components may be in communication with each other, directly or indirectly, over one or more buses 1135.

The network access device memory 1120 may include RAM or ROM. The network access device memory 1120 may store computer-readable, computer-executable code 1125 containing instructions that are configured to, when executed, cause the network access device processor 1110 to perform various functions described herein related to wireless communication, including, for example, transmitting a pull-in signal, transmitting a synchronization channel, etc. Alternatively, the computer-executable code 1125 may not be directly executable by the network access device processor 1110 but be configured to cause the network access device 1105 (e.g., when compiled and executed) to perform various of the functions described herein.

The network access device processor 1110 may include an intelligent hardware device, e.g., a CPU, a microcontroller, an ASIC, etc. The network access device processor 1110 may process information received through the network access device transceiver(s) 1150, the network access device communicator 1130, or the network communicator 1140. The network access device processor 1110 may also process information to be sent to the transceiver(s) 1150 for transmission through the antenna(s) 1155, to the network access device communicator 1130, for transmission to one or more other network access devices (e.g., network access device 1105-a and/or network access device 1105-b), or to the network communicator 1140 for transmission to a core network 1145, which may be an example of one or more aspects of the core network 130 described with reference to FIG. 1. The network access device processor 1110 may handle, alone or in connection with the network access device wireless communication manager 1160, various aspects of communicating over (or managing communications over) a non-contention-based radio frequency spectrum or a contention-based radio frequency spectrum.

The network access device transceiver(s) 1150 may include a modem configured to modulate packets and provide the modulated packets to the network access device antenna(s) 1155 for transmission, and to demodulate packets received from the network access device antenna(s) 1155. The network access device transceiver(s) 1150 may, in some examples, be implemented as one or more network access device transmitters and one or more separate network access device receivers. The network access device transceiver(s) 1150 may support communications in the non-contention-based radio frequency spectrum or the contention-based radio frequency spectrum. The network access device transceiver(s) 1150 may be configured to communicate bi-directionally, via the network access device antenna(s) 1155, with one or more UEs or apparatuses, such as one or more of the UEs described with reference to FIG. 1 or 10, or the apparatus described with reference to FIG. 6. The network access device 1105 may, for example, include multiple network access device antennas 1155 (e.g., an antenna array). The network access device 1105 may communicate with the core network 1145 through the network communicator 1140. The network access device 1105 may also communicate with other network access devices, such as the network access device 1105-*a* and/or the network access device 1105-*b*, using the network access device communicator 1130.

The network access device wireless communication manager 1160 may be configured to perform or control some or all of the techniques or functions described with reference to FIG. 1, 2, 3, 4, 5, 8, or 9 related to wireless communication over the non-contention-based radio frequency spectrum or the contention-based radio frequency spectrum. The network access device wireless communication manager 1160 may include a network access device non-contention-based RF spectrum manager 1165 configured to handle communications in the non-contention-based radio frequency spectrum, and a network access device contention-based RF spectrum manager 1170 configured to handle communications in the contention-based radio frequency spectrum. The network access device wireless communication manager 1160, or portions of it, may include a processor, or some or all of the functions of the network access device wireless communication manager 1160 may be performed by the network access device processor 1110 or in connection with the network access device processor 1110. In some examples, the network access device wireless communication manager 1160 may be an example of the wireless communication manager described with reference to FIG. 1, 8, or 9.

Figure 12:
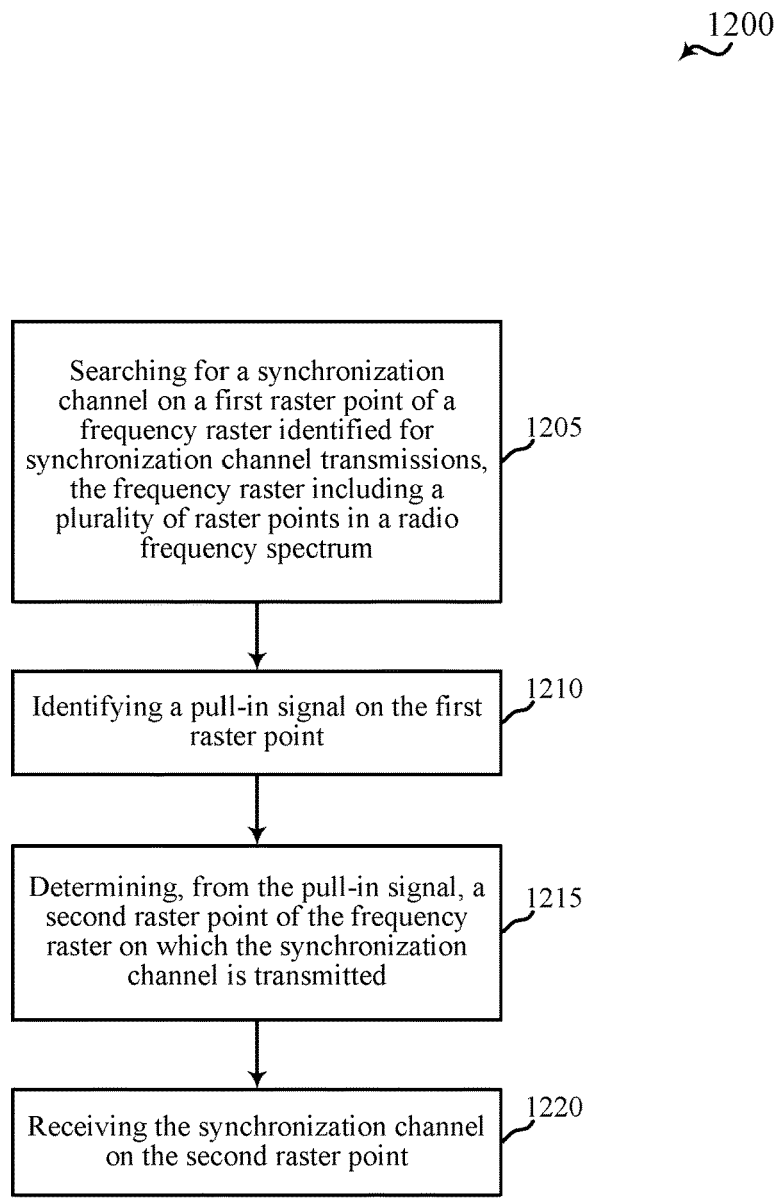
FIG. 12 is a flow chart illustrating an example of a method for wireless communication at a wireless device (e.g., a UE), in accordance with various aspects of the present disclosure.

FIG. 12 is a flow chart illustrating an example of a method 1200 for wireless communication at a wireless device (e.g., a UE), in accordance with various aspects of the present disclosure. For clarity, the method 1200 is described below with reference to aspects of one or more of the UEs described with reference to FIG. 1 or 10, aspects of the apparatus described with reference to FIG. 6, or aspects of one or more of the wireless communication managers described with reference to FIG. 1, 6, 7, or 10. In some examples, a wireless device may execute one or more sets of codes to control the functional elements of the wireless device to perform the functions described below. Additionally or alternatively, the wireless device may perform one or more of the functions described below using special-purpose hardware.

At block 1205, the method 1200 may include searching for a synchronization channel on a first raster point of a frequency raster identified for synchronization channel transmissions. The frequency raster may include a plurality of raster points in a radio frequency spectrum. In certain examples, the operation(s) at block 1205 may be performed using the synchronization channel search manager 635 or 735 described with reference to FIG. 6 or 7.

At block 1210, the method 1200 may include identifying a pull-in signal on the first raster point. In some examples, the pull-in signal may include a PI-PSS and a PI-SSS, and the pull-in signal may be identified based at least in part on the PI-PSS. In some examples, the PI-PSS may have a same duration as a PSS of the synchronization channel, and the PI-PSS and the PSS may include different sequences. In some examples, the pull-in signal may further include a PIICH that indicates the second raster point. In some examples, the pull-in signal may include a PI-PSS and a PI-SSS, and the pull-in signal may be identified based at least in part on matching the PI-PSS and the PI-SSS to a combination of PSS and SSS reserved to identify a pull-in signal. In certain examples, the operation(s) at block 1210 may be performed using the pull-in signal identifier 640 or 740 described with reference to FIG. 6 or 7.

At block 1215, the method 1200 may include determining, from the pull-in signal, a second raster point of the frequency raster on which the synchronization channel is transmitted. In some examples, the pull-in signal may indicate the second raster point relative to the first raster point. In certain examples, the operation(s) at block 1215 may be performed using the synchronization channel locator 645 or 745 described with reference to FIG. 6 or 7.

At block 1220, the method 1200 may include receiving the synchronization channel on the second raster point. In certain examples, the operation(s) at block 1220 may be performed using the synchronization manager 650 or 750 described with reference to FIG. 6 or 7.

In some examples of the method 1200, the pull-in signal may be identified (at block 1210), and the synchronization channel may be received (at block 1220), over a non-contention-based radio frequency spectrum. In these examples, the pull-in signal may be identified, for example, in an empty downlink data resource, an empty control resource, a resource that punctures a PDSCH, a resource that is rate-matched around by the PDSCH, or a combination thereof.

Figure 13:
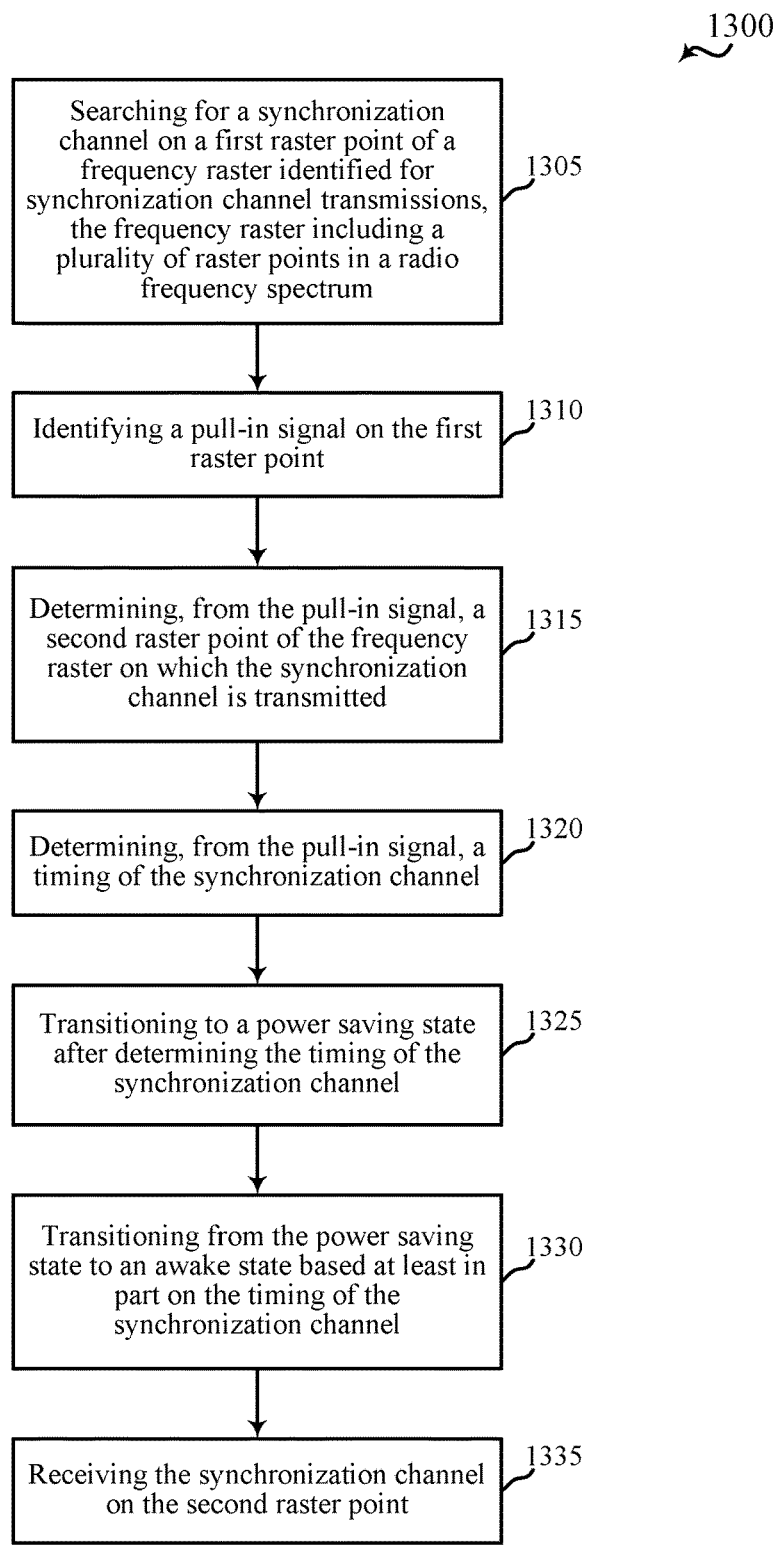
FIG. 13 is a flow chart illustrating an example of a method for wireless communication at a wireless device (e.g., a UE), in accordance with various aspects of the present disclosure.

FIG. 13 is a flow chart illustrating an example of a method 1300 for wireless communication at a wireless device (e.g., a UE), in accordance with various aspects of the present disclosure. For clarity, the method 1300 is described below with reference to aspects of one or more of the UEs described with reference to FIG. 1 or 10, aspects of the apparatus described with reference to FIG. 6, or aspects of one or more of the wireless communication managers described with reference to FIG. 1, 6, 7, or 10. In some examples, a wireless device may execute one or more sets of codes to control the functional elements of the wireless device to perform the functions described below. Additionally or alternatively, the wireless device may perform one or more of the functions described below using special-purpose hardware.

At block 1305, the method 1300 may include searching for a synchronization channel on a first raster point of a frequency raster identified for synchronization channel transmissions. The frequency raster may include a plurality of raster points in a radio frequency spectrum. In certain examples, the operation(s) at block 1305 may be performed using the synchronization channel search manager 635 or 735 described with reference to FIG. 6 or 7.

At block 1310, the method 1300 may include identifying a pull-in signal on the first raster point. In some examples, the pull-in signal may include a PI-PSS and a PI-SSS, and the pull-in signal may be identified based at least in part on the PI-PSS. In some examples, the PI-PSS may have a same duration as a PSS of the synchronization channel, and the PI-PSS and the PSS may include different sequences. In some examples, the pull-in signal may further include a PIICH that indicates the second raster point. In some examples, the pull-in signal may include a PI-PSS and a PI-SSS, and the pull-in signal may be identified based at least in part on matching the PI-PSS and the PI-SSS to a combination of PSS and SSS reserved to identify a pull-in signal. In certain examples, the operation(s) at block 1310 may be performed using the pull-in signal identifier 640 or 740 described with reference to FIG. 6 or 7.

At block 1315, the method 1300 may include determining, from the pull-in signal, a second raster point of the frequency raster on which the synchronization channel is transmitted. In some examples, the pull-in signal may indicate the second raster point relative to the first raster point. In certain examples, the operation(s) at block 1315 may be performed using the synchronization channel locator 645 or 745 described with reference to FIG. 6 or 7.

At block 1320, the method 1300 may include determining, from the pull-in signal, a timing of the synchronization channel. In some examples, the pull-in signal may indicate the timing of the synchronization channel relative to a second timing of the pull-in signal. In certain examples, the operation(s) at block 1320 may be performed using the synchronization channel locator 645 or 745 described with reference to FIG. 6 or 7.

At block 1325, the method 1300 may include transitioning to a power saving state after determining the timing of the synchronization channel. In certain examples, the operation(s) at block 1325 may be performed using the power manager 755 described with reference to FIG. 7.

At block 1330, the method 1300 may include transitioning from the power saving state to an awake state based at least in part on the timing of the synchronization channel. In certain examples, the operation(s) at block 1330 may be performed using the power manager 755 described with reference to FIG. 7.

At block 1335, the method 1300 may include receiving the synchronization channel on the second raster point. In certain examples, the operation(s) at block 1335 may be performed using the synchronization manager 650 or 750 described with reference to FIG. 6 or 7.

In some examples of the method 1300, the pull-in signal may be identified (at block 1310), and the synchronization channel may be received (at block 1335), over a non-contention-based radio frequency spectrum. In these examples, the pull-in signal may be identified, for example, in an empty downlink data resource, an empty control resource, a resource that punctures a PDSCH, a resource that is rate-matched around by the PDSCH, or a combination thereof.

Figure 14:
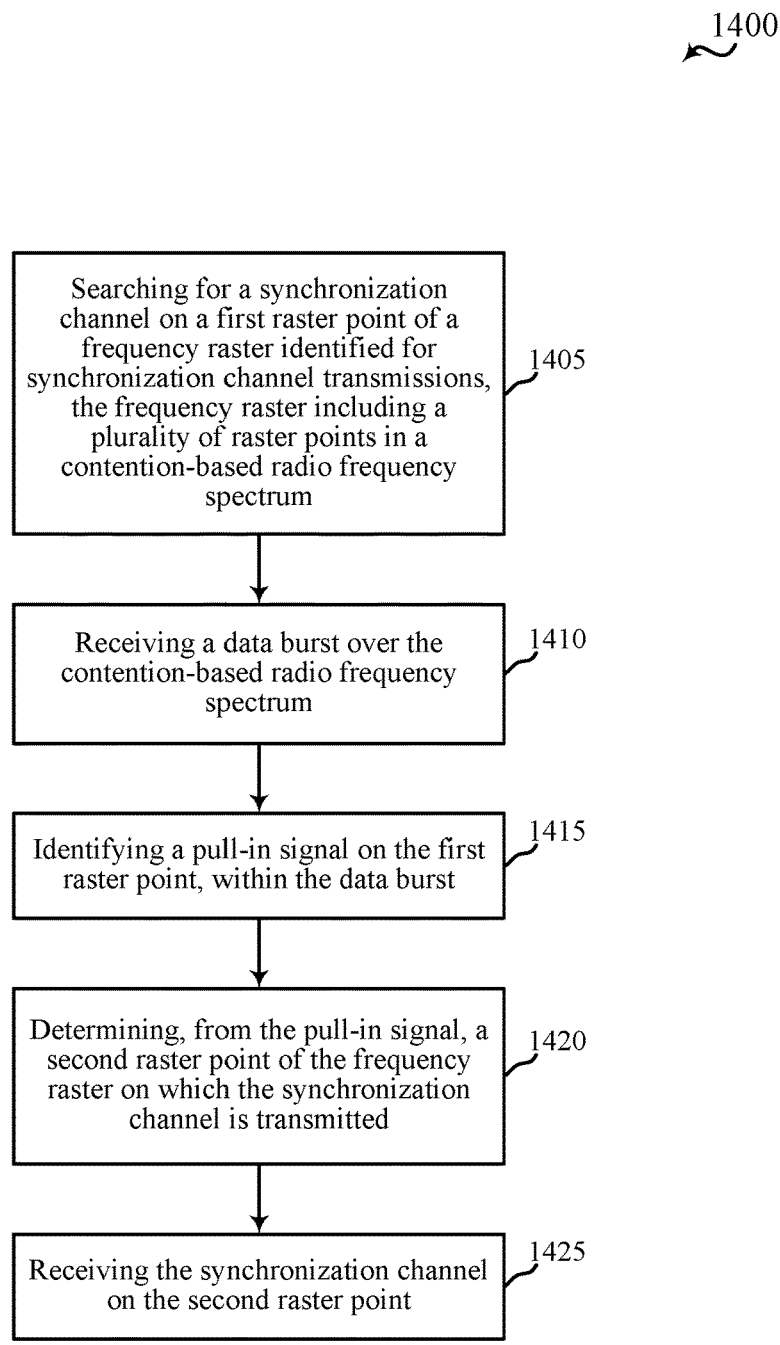
FIG. 14 is a flow chart illustrating an example of a method for wireless communication at a wireless device (e.g., a UE), in accordance with various aspects of the present disclosure.

FIG. 14 is a flow chart illustrating an example of a method 1400 for wireless communication at a wireless device (e.g., a UE), in accordance with various aspects of the present disclosure. For clarity, the method 1400 is described below with reference to aspects of one or more of the UEs described with reference to FIG. 1 or 10, aspects of the apparatus described with reference to FIG. 6, or aspects of one or more of the wireless communication managers described with reference to FIG. 1, 6, 7, or 10. In some examples, a wireless device may execute one or more sets of codes to control the functional elements of the wireless device to perform the functions described below. Additionally or alternatively, the wireless device may perform one or more of the functions described below using special-purpose hardware.

At block 1405, the method 1400 may include searching for a synchronization channel on a first raster point of a frequency raster identified for synchronization channel transmissions. The frequency raster may include a plurality of raster points in a contention-based radio frequency spectrum. In certain examples, the operation(s) at block 1405 may be performed using the synchronization channel search manager 635 or 735 described with reference to FIG. 6 or 7.

At block 1410, the method 1400 may include receiving a data burst over the contention-based radio frequency spectrum. In certain examples, the operation(s) at block 1410 may be performed using the data reception manager 760 described with reference to FIG. 6 or 7.

At block 1415, the method 1400 may include identifying a pull-in signal on the first raster point, within the data burst. In some examples, the pull-in signal may be identified, and the data burst may be received, over the contention-based radio frequency spectrum on a same transmission beam. In some examples, the pull-in signal may include a PI-PSS and a PI-SSS, and the pull-in signal may be identified based at least in part on the PI-PSS. In some examples, the PI-PSS may have a same duration as a PSS of the synchronization channel, and the PI-PSS and the PSS may include different sequences. In some examples, the pull-in signal may further include a PIICH that indicates the second raster point. In some examples, the pull-in signal may include a PI-PSS and a PI-SSS, and the pull-in signal may be identified based at least in part on matching the PI-PSS and the PI-SSS to a combination of PSS and SSS reserved to identify a pull-in signal. In certain examples, the operation(s) at block 1415 may be performed using the pull-in signal identifier 640 or 740 described with reference to FIG. 6 or 7.

At block 1420, the method 1400 may include determining, from the pull-in signal, a second raster point of the frequency raster on which the synchronization channel is transmitted. In some examples, the pull-in signal may indicate the second raster point relative to the first raster point. In certain examples, the operation(s) at block 1420 may be performed using the synchronization channel locator 645 or 745 described with reference to FIG. 6 or 7.

At block 1425, the method 1400 may include receiving the synchronization channel on the second raster point. In certain examples, the operation(s) at block 1425 may be performed using the synchronization manager 650 or 750 described with reference to FIG. 6 or 7.

Figure 15:
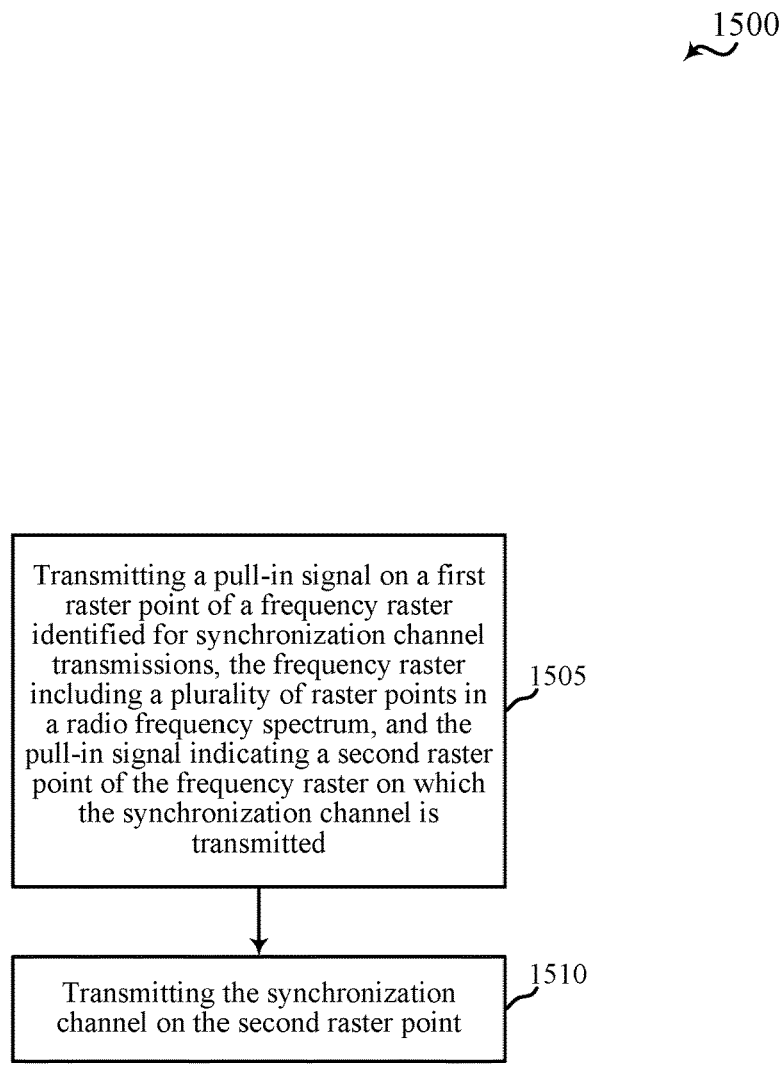
FIG. 15 is a flow chart illustrating an example of a method for wireless communication at a wireless device (e.g., a network access device), in accordance with various aspects of the present disclosure.

FIG. 15 is a flow chart illustrating an example of a method 1500 for wireless communication at a wireless device (e.g., a network access device), in accordance with various aspects of the present disclosure. For clarity, the method 1500 is described below with reference to aspects of one or more of the network access devices described with reference to FIG. 1 or 11, aspects of the apparatus described with reference to FIG. 8, or aspects of one or more of the wireless communication managers described with reference to FIG. 1, 8, 9, or 11. In some examples, a wireless device may execute one or more sets of codes to control the functional elements of the wireless device to perform the functions described below. Additionally or alternatively, the wireless device may perform one or more of the functions described below using special-purpose hardware.

At block 1505, the method 1500 may include transmitting a pull-in signal on a first raster point of a frequency raster identified for synchronization channel transmissions. The frequency raster may include a plurality of raster points in a radio frequency spectrum. The pull-in signal may indicate a second raster point of the frequency raster on which the synchronization channel is transmitted. In some examples, the pull-in signal may indicate the second raster point relative to the first raster point. In some examples, the pull-in signal may further indicate a timing of the synchronization channel. In some examples, the pull-in signal may indicate the timing of the synchronization channel relative to a second timing of the pull-in signal. In some examples, the pull-in signal may include a PI-PSS and a PI-SSS. In some examples, the PI-PSS may have a same duration as a PSS of the synchronization channel, and the PI-PSS and the PSS may include different sequences. In some examples, the pull-in signal may further include a PIICH that indicates the second raster point. In some examples, the pull-in signal may include a PI-PSS and a PI-SSS that match a combination of PSS and SSS reserved to identify a pull-in signal. In certain examples, the operation(s) at block 1505 may be performed using the pull-in signal transmission manager 835 or 935 described with reference to FIG. 8 or 9.

At block 1510, the method 1500 may include transmitting the synchronization channel on the second raster point. In certain examples, the operation(s) at block 1510 may be performed using the synchronization channel transmission manager 840 or 940 described with reference to FIG. 8 or 9.

In some examples of the method 1500, the pull-in signal and the synchronization channel may be transmitted over a contention-based radio frequency spectrum. In these examples, the pull-in signal may be transmitted within a data burst for which the wireless device has gained access to the contention-based radio frequency spectrum. In some examples, the pull-in signal and the data burst may be transmitted over the contention-based radio frequency spectrum on a same transmission beam. In certain examples, the data burst may be transmitted using the data channel transmission manager 950 described with reference to FIG. 9.

In some examples of the method 1500, the pull-in signal and the synchronization channel may be transmitted over a non-contention-based radio frequency spectrum. In these examples, the pull-in signal may be transmitted, for example, in an empty downlink data resource, an empty control resource, a resource that punctures a PDSCH, a resource that is rate-matched around by the PDSCH, or a combination thereof. In certain examples, the PDSCH (or another downlink data channel) may be transmitted using the data channel transmission manager 950 described with reference to FIG. 9, or a PDCCH (or another downlink control channel) may be transmitted using the control channel transmission manager 945 described with reference to FIG. 9.

In some examples, the method 1500 may include transmitting a plurality of instances of the synchronization channel, and the pull-in signal and the plurality of instances of the synchronization channel may be transmitted over a non-contention-based radio frequency spectrum. In these examples, the pull-in signal may be frequency domain multiplexed with an instance of the synchronization channel, and the pull-in signal and the instance of the synchronization channel may be transmitted using a same transmission beam.

Figure 16:
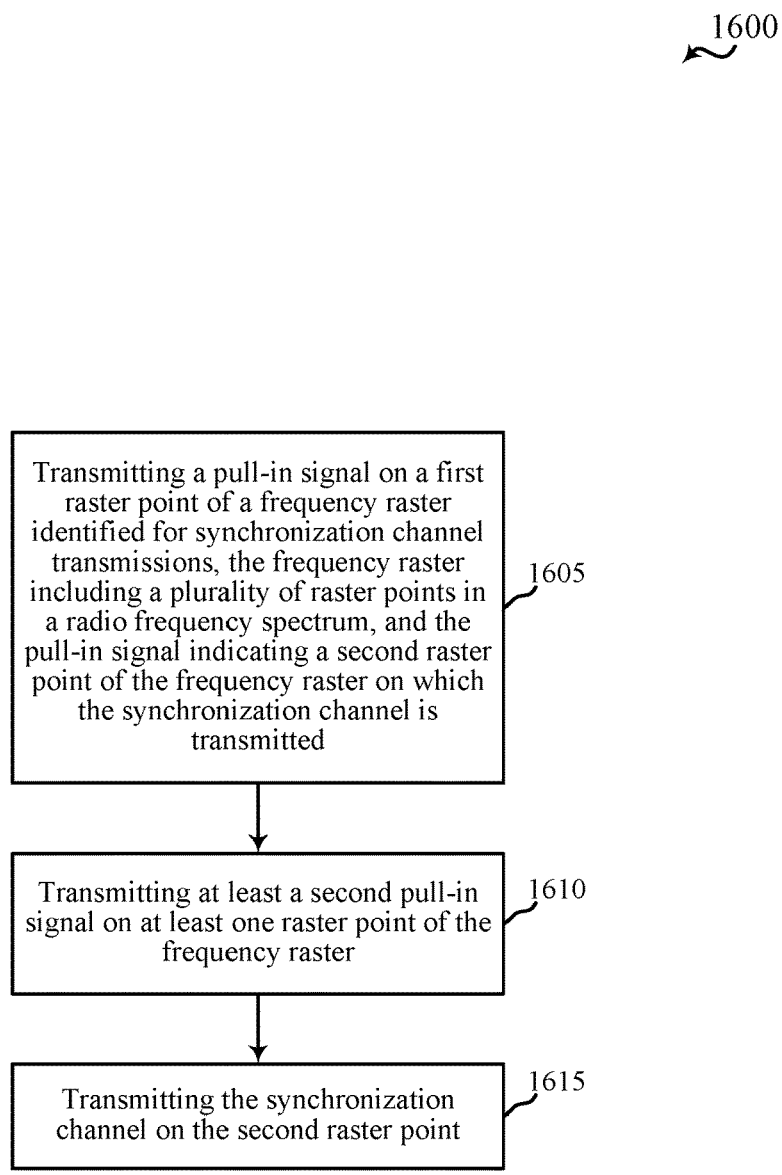
FIG. 16 is a flow chart illustrating an example of a method for wireless communication at a wireless device (e.g., a network access device), in accordance with various aspects of the present disclosure.

FIG. 16 is a flow chart illustrating an example of a method 1600 for wireless communication at a wireless device (e.g., a network access device), in accordance with various aspects of the present disclosure. For clarity, the method 1600 is described below with reference to aspects of one or more of the network access devices described with reference to FIG. 1 or 11, aspects of the apparatus described with reference to FIG. 8, or aspects of one or more of the wireless communication managers described with reference to FIG. 1, 8, 9, or 11. In some examples, a wireless device may execute one or more sets of codes to control the functional elements of the wireless device to perform the functions described below. Additionally or alternatively, the wireless device may perform one or more of the functions described below using special-purpose hardware.

At block 1605, the method 1600 may include transmitting a pull-in signal on a first raster point of a frequency raster identified for synchronization channel transmissions. The frequency raster may include a plurality of raster points in a radio frequency spectrum. The pull-in signal may indicate a second raster point of the frequency raster on which the synchronization channel is transmitted. In some examples, the pull-in signal may indicate the second raster point relative to the first raster point. In some examples, the pull-in signal may further indicate a timing of the synchronization channel. In some examples, the pull-in signal may indicate the timing of the synchronization channel relative to a second timing of the pull-in signal. In some examples, the pull-in signal may include a PI-PSS and a PI-SSS. In some examples, the PI-PSS may have a same duration as a PSS of the synchronization channel, and the PI-PSS and the PSS may include different sequences. In some examples, the pull-in signal may further include a PIICH that indicates the second raster point. In some examples, the pull-in signal may include a PI-PSS and a PI-SSS that match a combination of PSS and SSS reserved to identify a pull-in signal. In certain examples, the operation(s) at block 1605 may be performed using the pull-in signal transmission manager 835 or 935 described with reference to FIG. 8 or 9.

At block 1610, the method 1600 may transmitting at least a second pull-in signal on at least one raster point of the frequency raster. In some examples, the at least one raster point may include a raster point of the frequency raster other than the second raster point. In some examples, the pull-in signal and the second pull-in signal may be staggered in frequency, time, or a combination thereof. In certain examples, the operation(s) at block 1610 may be performed using the pull-in signal transmission manager 835 or 935 described with reference to FIG. 8 or 9.

At block 1615, the method 1600 may include transmitting the synchronization channel on the second raster point. In certain examples, the operation(s) at block 1615 may be performed using the synchronization channel transmission manager 840 or 940 described with reference to FIG. 8 or 9.

In some examples of the method 1600, the pull-in signal and the synchronization channel may be transmitted over a contention-based radio frequency spectrum. In these examples, the pull-in signal may be transmitted within a data burst for which the wireless device has gained access to the contention-based radio frequency spectrum. In some examples, the pull-in signal and the data burst may be transmitted over the contention-based radio frequency spectrum on a same transmission beam.

In some examples of the method 1600, the pull-in signal and the synchronization channel may be transmitted over a non-contention-based radio frequency spectrum. In these examples, the pull-in signal may be transmitted, for example, in an empty downlink data resource, an empty control resource, a resource that punctures a PDSCH, a resource that is rate-matched around by the PDSCH, or a combination thereof.

In some examples, the method 1600 may include transmitting a plurality of instances of the synchronization channel, and the pull-in signal and the plurality of instances of the synchronization channel may be transmitted over a non-contention-based radio frequency spectrum. In these examples, the pull-in signal may be frequency domain multiplexed with an instance of the synchronization channel, and the pull-in signal and the instance of the synchronization channel may be transmitted using a same transmission beam.

The methods 1200, 1300, 1400, 1500, and 1600 described with reference to FIGS. 12, 13, 14, 15, and 16 are examples of implementations of techniques described in the present disclosure. The operations of the method 1200, 1300, 1400, 1500, or 1600 may be rearranged, combined with other operations of the same or different methods, or otherwise modified, such that other implementations are possible. Operations may also be added to the method 1200, 1300, 1400, 1500, or 1600.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed radio frequency spectrum band. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communications at a user equipment (UE), comprising:
   searching for a synchronization channel on a first synchronization raster point of a frequency raster identified for synchronization channel transmissions, the frequency raster comprising a plurality of synchronization raster points in a radio frequency spectrum;
   identifying a pull-in signal on the first synchronization raster point;
   determining, from the pull-in signal, a next synchronization raster point of the frequency raster to be searched by the UE for the synchronization channel; and
   receiving the synchronization channel on the next synchronization raster point.

2. The method of claim 1, wherein the pull-in signal indicates the next synchronization raster point relative to the first synchronization raster point.

3. The method of claim 1, further comprising:
   determining, from the pull-in signal, a timing of the synchronization channel.

4. The method of claim 3, further comprising:
   transitioning to a power saving state after determining the timing of the synchronization channel; and
   transitioning from the power saving state to an awake state based at least in part on the timing of the synchronization channel.

5. The method of claim 3, wherein the pull-in signal indicates the timing of the synchronization channel relative to a second timing of the pull-in signal.

6. The method of claim 1, wherein the pull-in signal comprises a pull-in primary synchronization channel (PI-PSS) and a pull-in secondary synchronization channel (PI-SSS), and the pull-in signal is identified based at least in part on the PI-PSS.

7. The method of claim 6, wherein the PI-PSS has a same duration as a primary synchronization channel (PSS) of the synchronization channel, and the PI-PSS and the PSS comprise different sequences.

8. The method of claim 6, wherein the PI-PSS has a same duration and sequence as a primary synchronization signal (PSS) of the synchronization channel; and
   wherein the PI-SSS has a same duration and sequence as a secondary synchronization signal (SSS) of the synchronization channel.

9. The method of claim 6, wherein the pull-in signal further comprises a pull-in information channel (PITCH) that indicates the next synchronization raster point and has a same structure and coding as a physical broadcast channel (PBCH).

10. The method of claim 1, further comprising:
    receiving a data burst over a contention-based radio frequency spectrum;
    wherein the pull-in signal is identified, and the synchronization channel is received, over the contention-based radio frequency spectrum, and the pull-in signal is identified within the data burst.

11. The method of claim 10, wherein the pull-in signal is identified, and the data burst is received, over the contention-based radio frequency spectrum on a same transmission beam.

12. The method of claim 1, wherein the pull-in signal is identified, and the synchronization channel is received, over a non-contention-based radio frequency spectrum, and the pull-in signal is identified in at least one of: an empty downlink data resource, an empty control resource, a resource that punctures a physical downlink shared channel (PDSCH), a resource that is rate-matched around by the PDSCH, or a combination thereof.

13. A user equipment (UE) for wireless communications, comprising:
    a processor;
    memory in electronic communication with the processor; and
    instructions stored in the memory, wherein the instructions are executable by the processor to:
    search for a synchronization channel on a first synchronization raster point of a frequency raster identified for synchronization channel transmissions, the frequency raster comprising a plurality of synchronization raster points in a radio frequency spectrum;
    identify a pull-in signal on the first synchronization raster point;
    determine, from the pull-in signal, a next synchronization raster point of the frequency raster to be searched by the UE for the synchronization channel; and
    receive the synchronization channel on the next synchronization raster point.

14. The UE of claim 13, wherein the pull-in signal comprises a pull-in primary synchronization channel (PI-PSS) and a pull-in secondary synchronization channel (PI-SSS), and the pull-in signal is identified based at least in part on the PI-PSS.

15. The UE of claim 14, wherein the PI-PSS has a same duration and sequence as a primary synchronization signal (PSS) of the synchronization channel; and
    wherein the PI-SSS has a same duration and sequence as a secondary synchronization signal (SSS) of the synchronization channel.

16. The UE of claim 14, wherein the pull-in signal further comprises a pull-in information channel (PITCH) that indicates the next synchronization raster point and has a same structure and coding as a physical broadcast channel (PBCH).

17. A method for wireless communications at a base station, comprising:

transmitting a pull-in signal on a first synchronization raster point of a frequency raster identified for synchronization channel transmissions, the frequency raster comprising a plurality of synchronization raster points in a radio frequency spectrum, and the pull-in signal signaling a next synchronization raster point of the frequency raster to be searched by a user equipment (UE) for the synchronization channel; and transmitting the synchronization channel on the next synchronization raster point.

18. The method of claim 17, wherein the pull-in signal indicates the next synchronization raster point relative to the first synchronization raster point.

19. The method of claim 17, wherein the pull-in signal further indicates a timing of the synchronization channel.

20. The method of claim 19, wherein the pull-in signal indicates the timing of the synchronization channel relative to a second timing of the pull-in signal.

21. The method of claim 17, wherein the pull-in signal comprises a pull-in primary synchronization channel (PI-PSS) and a pull-in secondary synchronization channel (PI-SSS).

22. The method of claim 21, wherein the PI-PSS has a same duration as a primary synchronization channel (PSS) of the synchronization channel, and the PI-PSS and the PSS comprise different sequences.

23. The method of claim 21, wherein the PI-PSS has a same duration and sequence as a primary synchronization signal (PSS) of the synchronization channel; and wherein the PI-SSS has a same duration and sequence as a secondary synchronization signal (SSS) of the synchronization channel.

24. The method of claim 21, wherein the pull-in signal further comprises a pull-in information channel (PITCH) that indicates the next synchronization raster point and has a same structure and coding as a physical broadcast channel (PBCH).

25. The method of claim 17, wherein the pull-in signal and the synchronization channel are transmitted over a contention-based radio frequency spectrum, and the pull-in signal is transmitted within a data burst for which the base station has gained access to the contention-based radio frequency spectrum.

26. The method of claim 25, wherein the pull-in signal and the data burst are transmitted over the contention-based radio frequency spectrum on a same transmission beam.

27. The method of claim 17, wherein the pull-in signal and the synchronization channel are transmitted over a non-contention-based radio frequency spectrum, and the pull-in signal is transmitted in at least one of: an empty downlink data resource, an empty control resource, a resource that punctures a physical downlink shared channel (PDSCH), a resource that is rate-matched around by the PDSCH, or a combination thereof.

28. The method of claim 17, further comprising:

transmitting a plurality of instances of the synchronization channel;

wherein the pull-in signal and the plurality of instances of the synchronization channel are transmitted over a non-contention-based radio frequency spectrum, the pull-in signal is frequency domain multiplexed with an instance of the synchronization channel, and the pull-in signal and the instance of the synchronization channel are transmitted using a same transmission beam.

29. The method of claim 16, further comprising:

transmitting at least a second pull-in signal on a raster point of the frequency raster other than the next synchronization raster point, wherein the pull-in signal and the second pull-in signal are staggered in at least one of: frequency, time, or a combination thereof.

30. A base station for wireless communications, comprising:

a processor;

memory in electronic communication with the processor; and instructions stored in the memory, wherein the instructions are executable by the processor to:

transmit a pull-in signal on a first synchronization raster point of a frequency raster identified for synchronization channel transmissions, the frequency raster comprising a plurality of synchronization raster points in a radio frequency spectrum, and the pull-in signal signaling a next synchronization raster point of the frequency raster to be searched by a user equipment (UE) for the synchronization channel; and transmit the synchronization channel on the next synchronization raster point.

* * * * *